(12) United States Patent
Di Cairano et al.

(10) Patent No.: US 11,886,196 B2
(45) Date of Patent: Jan. 30, 2024

(54) CONTROLLING MACHINE OPERATING IN UNCERTAIN ENVIRONMENT DISCOVERABLE BY SENSING

(71) Applicant: Mitsubishi Electric Research Laboratories, Inc., Cambridge, MA (US)

(72) Inventors: Stefano Di Cairano, Newton, MA (US); Angelo Domenico Bonzanini, Berkley, CA (US); Ali Mesbah, Danville, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 117 days.

(21) Appl. No.: 17/222,342

(22) Filed: Apr. 5, 2021

(65) Prior Publication Data

US 2022/0317694 A1 Oct. 6, 2022

(51) Int. Cl.
  *G05D 1/02* (2020.01)
  *G06N 5/022* (2023.01)
(52) U.S. Cl.
  CPC ......... *G05D 1/0221* (2013.01); *G05D 1/0214* (2013.01); *G05D 1/0276* (2013.01); *G06N 5/022* (2013.01)

(58) Field of Classification Search
  CPC .. G05D 1/0221; G05D 1/0214; G05D 1/0276; G06N 5/022
  See application file for complete search history.

(56) References Cited

U.S. PATENT DOCUMENTS

| 9,568,915 B1* | 2/2017 | Berntorp ............. G05D 1/0214 |
| 2021/0208603 A1* | 7/2021 | Tazume ................. B64C 13/18 |

* cited by examiner

*Primary Examiner* — Kenneth J Malkowski
*Assistant Examiner* — Carville Albert Hollingsworth, IV
(74) *Attorney, Agent, or Firm* — Gene Vinokur; Hironori Tsukamoto

(57) ABSTRACT

A controller of a machine determines jointly a sequence of control inputs defining a state trajectory of the machine and a desired knowledge of the environment by solving a multivariable constrained optimization of a model of dynamics of the machine relating the state trajectory with the sequence of control inputs subject to a constraint on admissible values of the states and the control inputs defined based on the desired knowledge of the surrounding environment represented by the state of the environment and the uncertainty of the state of the environment determined from the measurements of the environment. In such a manner, the controller performs joint but imbalance optimization of the control inputs and the sensing instructions to the sensor for learning the environment.

18 Claims, 18 Drawing Sheets

CONTROLLING MACHINE OPERATING IN UNCERTAIN ENVIRONMENT DISCOVERABLE BY SENSING

TECHNICAL FIELD

This invention is related to control strategies for machines operating in an environment that is not completely known but can be discovered by sensing operations. Examples of machines include autonomous or semi-autonomous vehicles and autonomous robots.

BACKGROUND

Autonomous machines, such as automated vehicles, unmanned drones, automated ground vehicles, warehouse mobile robots, often operate in an environment that is only approximately known since it changes over time. A machine has to accomplish one or more assigned control goals and it must do so while avoiding unsafe events that may be due to the operation of the machine in the environment, such as colliding with an obstacle or leaving a specifically marked area in the environment. However, information on the environment can be acquired through sensing, using sensors in the machine itself or sensors in the environment which are connected to the machine via communication networks, which increases the knowledge of the environment.

For instance, one objective of an autonomous vehicle is to reach its target destination without colliding with other vehicles and while remaining within the road by staying within the appropriate lane markings. The location of other vehicles and road marking is not known a priori but can be acquired from sensors, such as radar, sonar, lidar, etc, as long as the different objects are in the range of the sensors and the line-of-sight. These sensors can be internal or external to the vehicles. For example, the sensors can be arranged on the vehicles or at road-side units (RSU).

In another example, a warehouse robot transports certain parts to a workbench while staying in the assigned corridor to avoid endangering human workers, and while avoiding collisions with other robots and materials in the warehouse. As human workers and materials move through the warehouse, their locations change in an unknown way, but this can be acquired from sensors onboard the robot, such as lidar and sonar, as long as the different objects are in the range and the line-of-sight of the sensors, or even relayed to the robot from sensors placed on the environment, as long as the robot is in the communication range of the sensor.

The amount of information that is acquired on a specific object in the environment depends on the amount of sensing such an object is subjected to: the more an object is observed using a sensor, the more information on the object is acquired, that is, the greater is the knowledge on the object state. Thus, information acquisition on an object in the environment for increasing its knowledge is a dynamic process.

On the other hand, the amount of information on the environment that is acquired via the sensors often depends on how the machine is operated. For instance, an object can be appropriately discovered and observed, only if it is in the range of the sensors for observing it, and if there is a free line-of-sight between the sensor placed on the machine and the object. Thus, if the machine is operated in such a way that the object stays more in the range and the line-of-sight of the sensor, the amount of information acquired on the object is greater, and the knowledge of the object state will be more precise. Also, the amount of information can increase while the range reduces, and hence if the machine is controlled closer to the obstacle, more information is acquired. However, going too close to the assumed position of an obstacle before enough knowledge on its actual position is available may present some risks.

If the motion of the machine is determined solely based on the available knowledge, the need to avoid unsafe events caused by the partially unknown environment may cause the motion of the machine to be overly cautious and stay on the most known path, which may result in degraded performance, e.g., longer time to reach the goal, more energy used, etc. On the other hand, if the motion of the machine is determined to acquire the most information on the environment, the motion of the machine may deviate significantly from that needed to achieve the control goal resulting in an overall degradation of performance, e.g., not reaching the goal, reaching the goal with significant delay.

Thus, there is a need for a control method that determines the optimal operation of a machine while avoiding unsafe events caused by an environment that is uncertain but can be discovered by sensing. The information acquisition capability of the sensing depends in turn on how the machine is operated, and such that the acquiring of information does not prevent the machine from achieving its goal or degrade its performance in achieving the goal.

SUMMARY

Some embodiments consider a controller for controlling a machine operating in a partially unknown environment discovered through sensing. The control objective is for the machine to achieve a given goal or a control objective, such as reaching a specific state or tracking a given reference signal, while ensuring the safety of the machine with respect to the operating requirements and its interaction with the environment.

Examples of such machines include autonomous vehicles, as well as aerospace vehicles and mobile or manipulator robots, for which the motion and dynamics models are available, but that are acting in an environment that is not completely known. For instance, the uncertainty of the environment may be due to the presence of other agents, such as other cars or objects, whose position and motion are not known a priori, but can be discovered using sensors such as cameras, lidars, or radars. Safety is ensured by controlling the vehicle or robot such that its motion satisfies operating specifications, such as limits on velocities, accelerations, and forces. Safe interaction with the environment is ensured by controlling the vehicle or robot such that it does not collide with other agents, e.g., other cars or other robots, and it remains in the area where it is proper for it to stay, e.g., the proper lane on the road or pre-defined workspace. Since the knowledge about other agents and possibly also the area of the motion is not complete, ensuring safe interaction may not be completely certain, but it can be rendered more certain by acquiring more information from sensors which increases knowledge on those.

For machines operating according to the definitions and examples above, the commands issued by the control depend on the amount of knowledge available in the environment. For instance, the control may want to avoid areas where there is no knowledge in order to avoid undetected risks. On the other hand, also the sensing depends on how the control operates the machine through its commands. For instance, how close the machine is to an area determines how well such an area is sensed. As another example, the controller may decide in real-time the amount of processing done on the data sensed on a certain area, which can increase or decrease the amount of information extracted from sensors. Thus, there is a circular interdependence between sensing and control.

However, the overall aim of the controller is to achieve a specific control objective for the machine. Hence, the sensing objective is secondary to the control objective, as it does not motivate the operation of the machine by itself, although it affects it.

To that end, some embodiments disclose interdependent but imbalanced, control, and sensing applications in which the control is a primary objective and the sensing is the secondary one. To achieve interdependency, the embodiments determine a state trajectory of a machine and an amount of knowledge required of a state of environment surrounding the machine jointly, e.g., as part of a single unitary multivariable optimization. To achieve the unbalance in their importance, some embodiments use multivariable constrained optimization over the state trajectory and the amount of knowledge of the state of the environment, in which the knowledge of the environment acts into a constraint that determines the admissible values for the machine state and control commands. In such a manner, the knowledge of the environment becomes subordinate to the control objective, because the amount of knowledge acting onto the constraint does not have an independent optimization objective, and acts by limiting the admissible values for the machine state and control commands.

Thus, various embodiments determine the control objective as a performance objective, while determining the knowledge of the environment by appropriate constraints that limit the operation of the machine. Such constraints are composed of a deterministic component and an uncertainty component. The deterministic component represents the constraints based on the current knowledge of the environment. The uncertainty component represents how much additional safety margin must be left in the constraint-based on how reliable the current knowledge of the environment is. Hence, the effect of the uncertainty component is to make the constraints the more stringent, the less reliable the currently available knowledge on the environment is.

As a result, the controller will operate the machine to improve sensing in areas where a better knowledge allows the control to operate the machine such that it has higher performance in reaching the goal, but it will not modify the machine operation to improve the knowledge of the environment if this reduces the performance of achieving the goal.

Some embodiments design the controller as a predictive control subject to probabilistic constraints, where the uncertainty in such probabilistic constraints is the predicted reliability of the estimate of the environment. The reliability of the estimate of the environment is computed using a model of the estimator that can be constructed based on dynamical equations or machine learning models. While the probabilistic constraints account for the limitations on the machine operation imposed by the environment while accounting for the uncertainty in the knowledge of the environment, the cost function of the predictive controller accounts for the achieving of the goal. Additionally or alternatively, some embodiments include a secondary objective of improving knowledge of certain parts of the environment and still achieve the goal by appropriately designing the cost function.

Accordingly, one embodiment discloses a controller for controlling an operation of a machine, comprising: at least one processor; and memory having instructions stored thereon that, when executed by the at least one processor, cause the controller to: acquire knowledge of an environment surrounding the machine from measurements of at least one sensor sensing the environment based on a state of the machine and sensing instructions controlling an operation of the sensor; process the acquired knowledge of the environment and to estimate a state of the environment and uncertainty of the state of the environment; determine jointly a sequence of control inputs to the machine defining a state trajectory of the machine and a desired knowledge of the environment by solving a multivariable constrained optimization of a model of dynamics of the machine relating the state trajectory with the sequence of control inputs subject to a constraint on admissible values of the states and the control inputs defined based on the desired knowledge of the surrounding environment represented by the state of the environment and the uncertainty of the state of the environment; control the machine based on the sequence of control inputs to change the state of the machine; and update the sensing instructions based on the desired knowledge of the environment and submit the updated sensing instructions to the sensor.

DETAILED DESCRIPTION

Figure 1A:
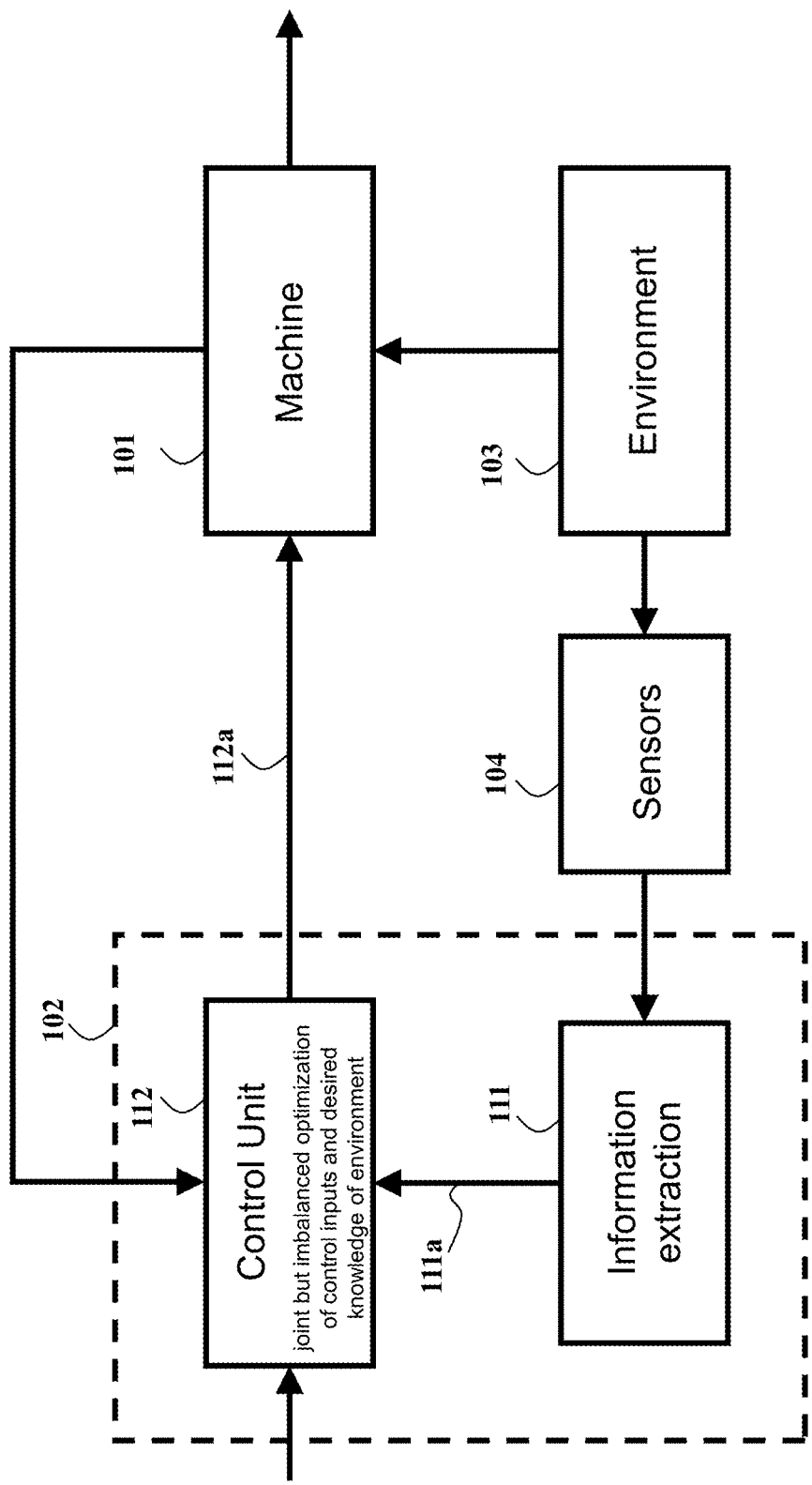
FIG. 1A is a schematic of a general architecture considered in this disclosure, including a controller for controlling a machine operating in an environment that is discovered by sensing.

FIG. 1A is a schematic of a control architecture according to some embodiments. A machine 101 is controlled by a controller 102 and is operating in an environment 103 that affects the operation and can be discovered by sensing. The behavior of machine 101 in response to the commands issued by controller 102 is assumed to be known. The environment in which the machine operates is not perfectly known, but information on it can be acquired from sensors 104 placed on or remotely connected to the machine. The controller 102 contains an information extraction 111 on the data on the environment 103 obtained from the sensors 104 and uses that information together with known information on the machine 101 in a control unit 112 to compute the command for the machine to achieve the control objective while ensuring safety with respect to the machine 101 operational requirements and the interaction with the environment 103.

Thus, there is a need for a method and machine that determines the optimal operation of a machine while avoiding unsafe events caused by an environment that is uncertain but can be discovered by sensing, where the information acquisition capability of the sensing depends in turn on how the machine is operated such that the acquiring of information does not prevent the machine of achieving its goal or degrade its performance in achieving the goal.

Some embodiments are based on a recognition that the sensing objective is secondary to the control objective, as it does not motivate the operation of the machine by itself, although it affects it. To that end, some embodiments disclose interdependent but imbalanced, control, and sensing applications in which the control is a primary objective and the sensing is the secondary one.

Figure 1B:
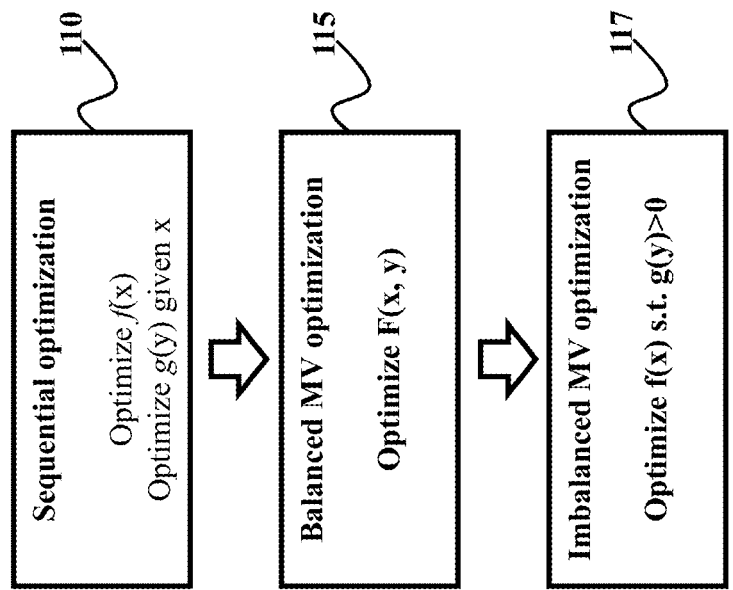
FIG. 1B is a schematic of joint multi-variable optimization used by some embodiments.
Figure 1C:
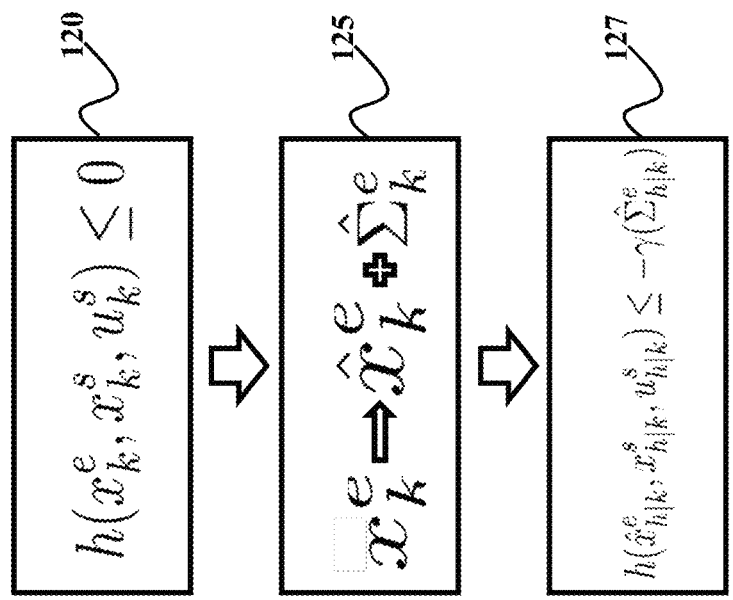
FIG. 1C is a schematic of a constraint used by the imbalance multivariable constrained optimization according to some embodiments.
Figure 1D:
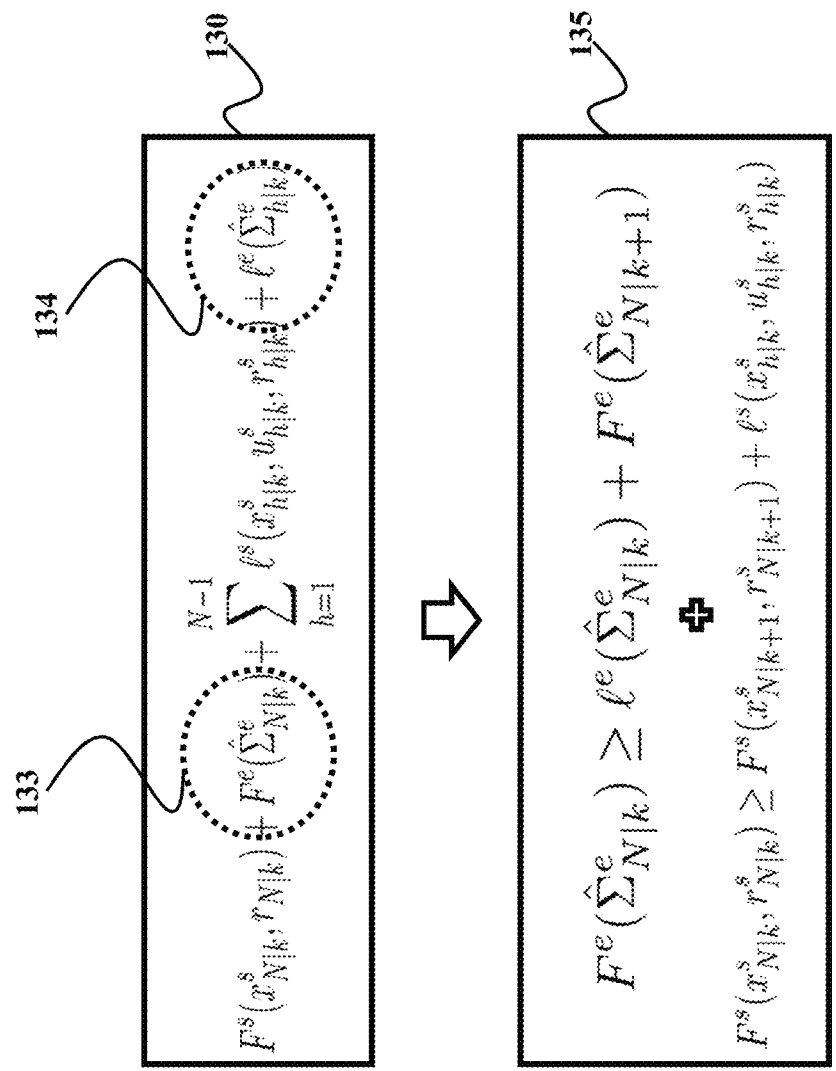
FIG. 1D is a schematic of principles of cost function optimized by the imbalance multivariable constrained optimization according to some embodiments.

To that end, the control unit 112 performs joint but imbalanced optimization of control inputs and desired knowledge of the environment. FIGS. 1B, 1C, and 1D show schematic illustrating different principles of joint but imbalanced optimization performed by the control unit 112 as well as some realizations employed by different embodiments. FIGS. 1B-1D are provided for clarity, not as a limitation.

FIG. 1B shows a schematic of joint multi-variable optimization used by some embodiments. To achieve interdependency, the embodiments determine a state trajectory of a machine and an amount of knowledge required of a state of environment surrounding the machine jointly, i.e., as part of a single unitary multivariable optimization. Hence, some embodiments replace a sequential optimization 110 and a balance multi-variable optimization 115 with imbalance multi-variable optimization 117.

To achieve the unbalance in their importance, some embodiments use multivariable constrained optimization over the state trajectory and the amount of knowledge of the state of the environment, in which the knowledge of the environment acts into a constraint. In such a manner, the knowledge of the environment becomes subordinate to the control objective, because the amount of knowledge acting onto the constraint does not have an independent optimization objective, and it is only limiting the control commands chosen for the machine.

FIG. 1C shows a schematic of a constraint used by the imbalance multivariable constrained optimization according to some embodiments. It is an object of some embodiments to provide such a multivariable constrained optimization of the control commands and the required knowledge that updates the sensing instruction only when the required knowledge is insufficient to optimize the state trajectory of the machine. To that end, it was realized that additionally or alternatively to imposing the constraint to the acquired knowledge, there is a need to impose constraints on the admissible states of the machine based on the knowledge that will be acquired. These admissible states govern the space of optimization of the state trajectory of the controlled machine and thus creates a need to increase the acquired knowledge only if the lack of it prevents reaching the optimal trajectory. In such a manner, some embodiments aim to define the constraints having a structure of interaction constraint 120.

In some embodiments, the environment is defined by its state referred to herein as a state of the environment or the environment state. The state of the environment collects all relevant data about the environment, from the perspective of its impact on the controlled machine. The state of the environment can include multiple state variables such as occupancy grid in an area surrounding the controlled machine, the motion of the points and/or objects in the surrounding environment, the boundary of the space where the controlled machine can operate, the allowed separation and relative velocities of the machine with the objects in the environment. The state of the environment captures relevant and available or acquired knowledge. The acquired knowledge can be unambiguously transformed into the constraints on the admissible values of the states and the control inputs. However, for the purpose of multivariable constrained optimization, there is also a need to define the constraints based not only on the amount of available knowledge of the environment but also on the lack of this knowledge. It is challenging to define the constraints based on what is unknown.

Some embodiments are based on the realization that the constraints on admissible values of the states and the control inputs can include two parts. The first can be positively defined by the current knowledge of the environment. The second part has a negative nature because it defines the lack of precise knowledge. Some embodiments are based on the realization that the negative nature of the second part can be transformed into a positive limitation based on the first part. That is, instead of having the second part describing the unknowns, the second part can be positively defined as the uncertainty of the first part. In such a manner, instead of having the constraint defined by the known knowledge of the environment and the unknown knowledge about the environment, some embodiments determined the constraint 120 defined by the knowledge of the environment and uncertainty about what has been defined by the knowledge of the environment. Such transformation allows representing unknown knowledge in a manner suitable for constraint derivation.

Hence, in some embodiments, constraint 120 is defined probabilistically using the state of the environment and the uncertainty of the state of the environment. For example, when the known, i.e., acquired, knowledge is used to define a region of admissible state values or equivalently a region of inadmissible state values of the controlled machine, the uncertainty of the lack of knowledge can be positively represented by shrinking the region of admissible values and/or increasing the region of inadmissible values. In such a manner, the probabilistic constraint 120 can reflect the uncertainty of the knowledge.

Armed with this understanding, some embodiments combine the constraints 120 and representation 125 into a probabilistic or chance constraint 127. Constraint 127 can have various implementations. For example, constraint 127 can be implemented to bound a function of the interaction of the state of the machine, the state of the environment, and the control inputs by a negative of a monotonically increasing function of a metric of the uncertainty of the state of the environment.

FIG. 1D shows a schematic of principles of cost function optimized by the imbalance multivariable constrained optimization according to some embodiments. Some embodiments are based on the recognition that the principles of the operation of the machine 101 can be captured by the cost function 130 including a stage cost 133 and a terminal cost 134, each including a term proportional to the performance of the state of the machine relative to the control objective and a term proportional to the amount of knowledge of the environment. Some embodiments are based on a recognition that the inclusion of the term proportional to the amount of knowledge of the environment in the stage cost and the terminal cost in the cost function may help the case where the objective the control is changed in the future because this could require the machine to operate in the previously avoided area where information has not been acquired as it was not relevant to the previous control objectives.

However, some embodiments are based on a recognition that to achieve the imbalance control, the cost function 130 should not be dependent on the state of the environment. To that end, some embodiments either remove the stage and terminal const from the cost function, e.g., by making their weights equal to zero, or impose a special constraint 135 allowing to improve the acquired knowledge in one or a combination of two scenarios. In the first scenario, the controller does not make any effort to improve the knowledge of the environment unless this brings direct benefits to the performance of achieving the control objective. In the second scenario, the controller may still improve the knowledge of the environment as long as this does not prevent the achieving the control objective.

For example, in some embodiments, the multivariable constrained optimization optimizes a cost function 130 including a stage cost 133 of the operation of the machine controlled by optimized control inputs taken along a prediction horizon, a terminal cost 134 associated with terminal conditions at the end of the prediction horizon. Each of the stage cost and the terminal cost includes a performance term related to the performance of the operation of the machine according to a control objective and an environment term related to the uncertainty of the state of the environment. The balancing between these terms is obtained by non-negative weights multiplying each term. For example, to perform the balancing the controller can check an expected progress of satisfaction of the control objective and select the weights of the terms of the stage cost and the terminal cost to be zero when the satisfaction of the control objective cannot be guaranteed and, otherwise, select weights of the stage cost and the terminal cost allowing to satisfy the control objective. In some implementations, the satisfaction of the control objective is guaranteed when the environment term of the stage cost and the environment term of the terminal cost for a current time step can be made less than the environment term for the terminal cost at a previous time step while keeping the control term of the stage cost and the control term of terminal cost for the current time step not larger than the control term of terminal cost for the previous time step.

Figure 2:
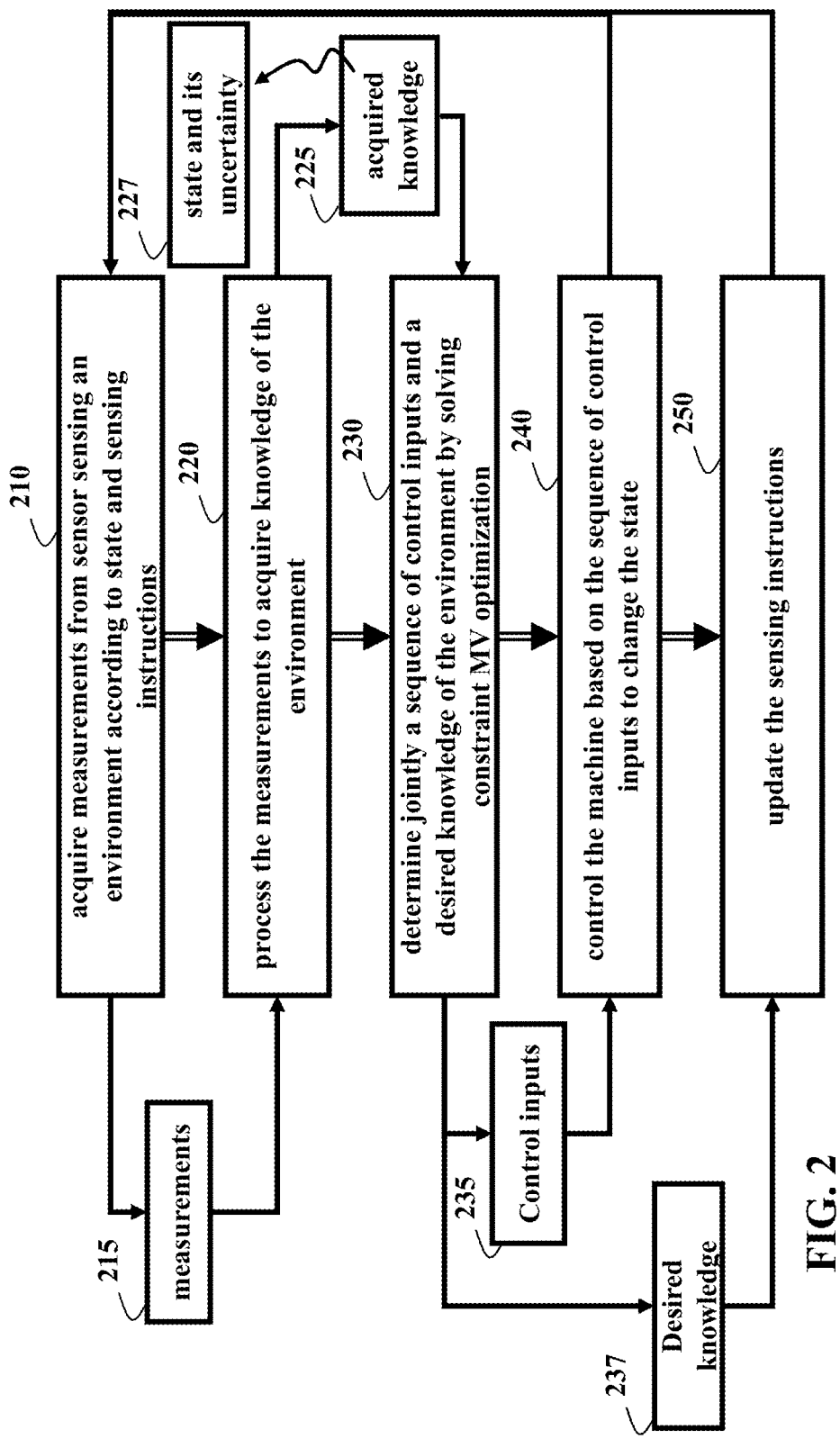
FIG. 2 is a block diagram of a method for multivariable constrained optimization performed by some embodiments to achieve joint but imbalance optimization.

FIG. 2 shows a block diagram of a method for multivariable constrained optimization performed by some embodiments of controller 102 to achieve joint but imbalance optimization. The controller 102 is configured to acquire 210 measurements 215 from at least one sensor sensing an environment surrounding the machine based on a state of the machine and sensing instructions controlling an operation of the sensor and process 220 the measurements to acquire knowledge 225 of the environment and to estimate 227 a state of the environment and uncertainty of the state of the environment.

Next, the controller is configured to determine 230 jointly a sequence of control inputs 235 to the machine defining a state trajectory of the machine and a desired knowledge 237 of the environment by solving a multivariable constrained optimization of a model of dynamics of the machine relating the state trajectory with the sequence of control inputs subject to a constraint on admissible values of the states and the control inputs defined based on the desired knowledge 237 of the surrounding environment represented by the state of the environment and the uncertainty of the state of the environment. The controller 102 uses the solution of the multivariable constrained optimization problem to control 240 the machine based on the sequence of control inputs 235 to change the state of the machine, and to update 250 the sensing instructions based on the desired knowledge 237 of the environment and submit the updated sensing instructions to the sensor.

Exemplary Structural Components

Figure 3A:
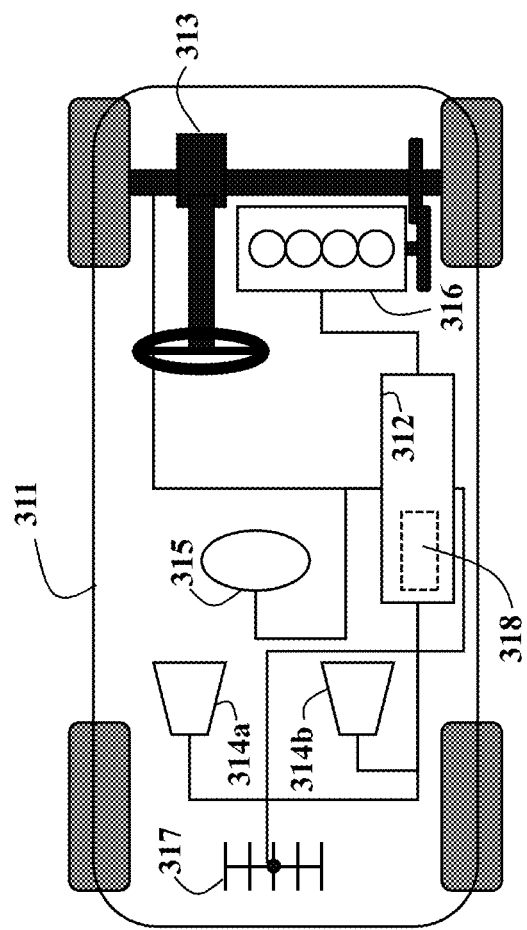
FIG. 3A is a schematic of an exemplar controller for controlling a vehicle operating in the environment that is discovered by sensing according to some embodiments.

FIG. 3A is a schematic of a vehicle 311 including a controller 312 employing principles of some embodiments of the present disclosure. As used herein, vehicle 311 can be any type of wheeled vehicle, such as a passenger car, bus, or rover. Also, vehicle 311 can be autonomous or semi-autonomous. For example, some embodiments control the motion of vehicle 311. Examples of the motion include the lateral motion of the vehicle controlled by a steering machine 313 of the vehicle 311. The steering machine 313 is controlled by controller 312.

The vehicle can also include an engine 316, which can be controlled by the controller 312 or by other components of the vehicle 311. The vehicle 311 can also include one or more sensors 315 to sense, by non-limiting example, its current motion quantities and internal status. Examples of the sensors 315 include global positioning machine (GPS), accelerometers, inertial measurement units, gyroscopes, shaft rotational sensors, torque sensors, deflection sensors, pressure sensor, and flow sensors. The vehicle can be equipped with a transceiver 317 enabling communication capabilities of the controller 312 through wireless communication channels via an input interface 318. The vehicle includes one or more sensors 314a, 314b to sense the surrounding environment. Examples of the sensors 314a, 314b may be distance range finders, radars, lidars, and cameras. Alternatively or concurrently, sensor data on the surrounding environment can be received through the transceiver 317 for sensors that are placed remotely with respect to the vehicle. The vehicle can be equipped with a map database machine that stores data about the road in the area where the vehicle operates, or it can access map data stored remotely through the transceiver 317.

In this example, vehicle 311 is the controlled machine 101, the sensors 314a, 314b, and any remote sensors whose information is received from the transceiver 317 are the sensors 104, the controller 312 is the controller 102, the road and the other vehicles are the environment 103.

Figure 3B:
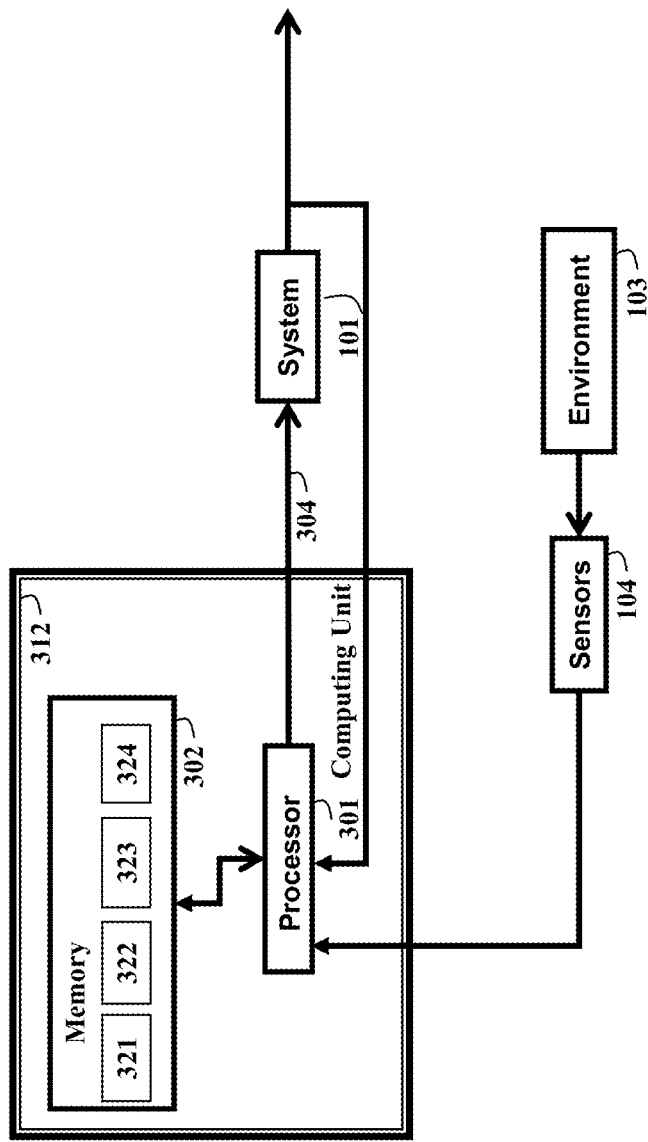
FIG. 3B is a block diagram according to some embodiments of the present disclosure of the computational platform of the controller for controlling the machine operating in the environment discovered by sensing.

FIG. 3B is a block diagram of the computational platform of controller 102 according to some embodiments. For example, FIG. 3B shows a block diagram of controller 312 according to one embodiment. The controller 102 includes a hardware processor 301 connected to a memory 302, e.g., a non-transitory computer-readable medium. In some implementations, the memory 302 includes a first section 321 for storing data about the machine 101 and a second section 322 for storing a program of the control unit 112 for computing the control of the machine, a third section 323 for storing data about the environment 103 and a fourth section 324 for storing a program for extracting data 111 on the environment from data from sensors 104.

For example, the first section 321 of the memory 302 can store parameters for the behavior of the machine, such as maximum acceleration and maximal velocity, as well as a model of the machine and the goal for the machine. The second section 322 of the memory 302 can have embodied thereon a program executable by the processor 301 for computing the command to the vehicle 311.

Still referring to FIG. 3B, the third section 323 of the memory 302 includes data about the environment, such as the allowed operating space and the presence of other agents, the allowed interactions, and the updated information and the historical amount of information available for the elements in the environment. The fourth section 324 of the memory 302 can have embodied thereon a program executable by the processor 301 for processing information obtained from the sensors 314a, 314b in the vehicle 311 and remote sensors that communicate through transceiver 317.

The processor 301 can be any computational device capable of performing computations and can include one or many physical devices of the same or of different types. It is possible that processor 301 can include multiple computational devices, e.g., microprocessors. Similarly, the memory 302 can be any logical memory and/or non-transitory computer-readable storage medium capable of storing data and can include one or more physical data storage means, of the same or of different types. The computations performed by the processor 301 are commanded by the program stored in the second section 322 and fourth 324 section of the memory, and use the machine data stored in the first section 321 and third section 323 of the memory, the data obtained from the sensors 315, 314a, 314b and transceiver 317. The computation of processor 301 results in commands 304 that change the state of the machine 101.

Exemplary Control Objectives

Figure 4A:
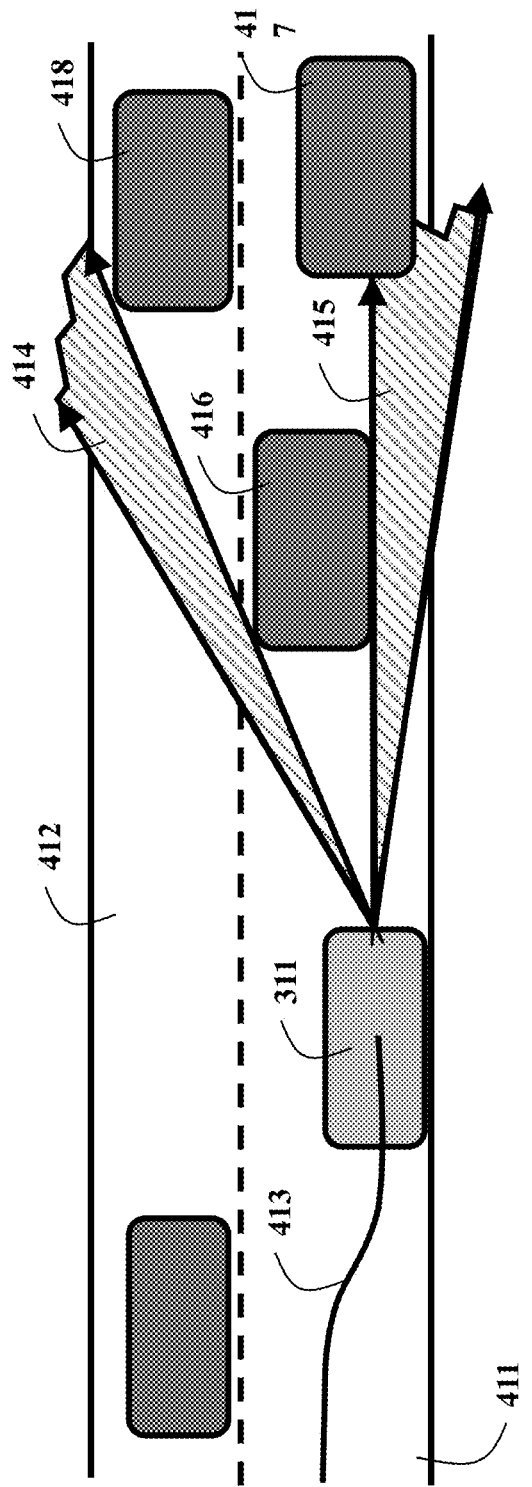
FIG. 4A is a schematic of the results of the operation of the controller according to some embodiments of the disclosure when the controller operates a vehicle to either remain in the current lane or change lane to the left, and remaining in the current lane seems preferable.
Figure 4B:
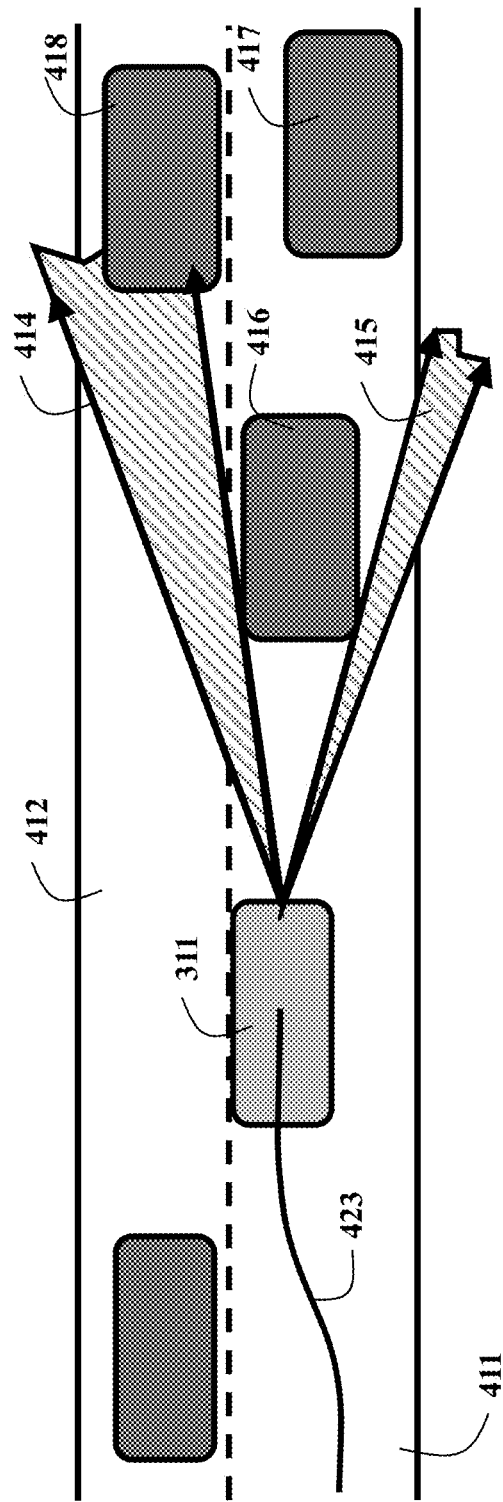
FIG. 4B is a schematic of the results of the operation of the controller according to some embodiments of the disclosure when the controller operates a vehicle to either remain in the current lane or change lane to the left, and remaining in the current lane seems preferable.

Some embodiments are based on a realization that when machine 101 operates in an environment that is not known but discovered through the information acquired through sensing, which itself is related to the commands applied. For instance, FIGS. 4A, 4B show a scenario when vehicle 311 has to decide whether to stay in the current lane 411 or change to a left lane 412. If the controller chooses the trajectory 413 in FIG. 4A, due to the presence of preceding vehicle 416 the sensor field of view 414, 415 can capture information on the vehicle further ahead in the current lane 417 but not the vehicle ahead in the left lane 418. If the vehicle chooses the trajectory 423 in FIG. 4B, due to the presence of preceding vehicle 416 the sensor field of view 414, 415 cannot capture information on the vehicle further ahead in the current lane 417 but can capture information on the vehicle ahead in the left lane 418. Thus, trajectory 413 allows acquiring of more information on other vehicles in the current lane, while trajectory 423 allows acquiring more information on vehicles in the left lane. However, the control commands also depend on the available knowledge of the environment. Thus, if it is desired to change the lane, lack of knowledge on the vehicle ahead in the left lane 418 may not allow the controller to safely plan a trajectory for the vehicle to change to the left lane 412, because of the uncertainty of the position of vehicles in such lane. Thus, the control commands affect the available knowledge on the environment and the availability of knowledge on the environment affects the control commands.

Figure 5A:
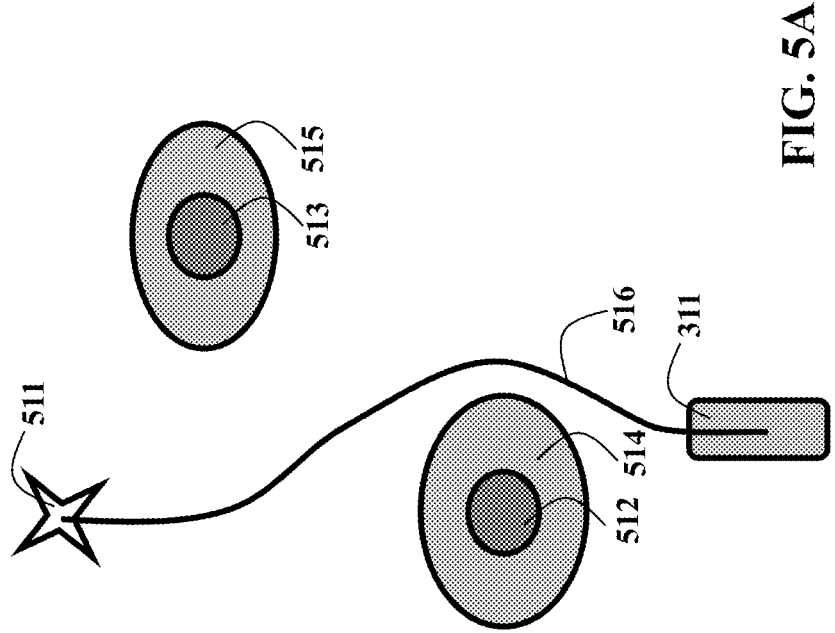
FIG. 5A is a schematic of the results of the operation of the controller according to some embodiments of the disclosure when the controller operates a vehicle to reach a target position while avoiding constraints imposed by collision avoidance, where the constraints are enlarged due to uncertainty of the environment and the controller does not take any action to reduce such uncertainty.

Thus, it may be necessary to select the control commands so that the goal can be achieved and knowledge of the environment can be acquired. However, these two objectives may be in conflict. FIG. 5A shows a scenario where vehicle 311 must achieve a goal position 511, and there are two obstacles 512, 513. Vehicle 311 has a control objective to reach goal position 511 without colliding with obstacles 512, 513. Since the obstacle position is not exactly known, without using information from the sensors, an additional safety margin may need to be allowed for avoiding collisions, so that the vehicle may need to avoid areas 514, 515. This results in planning trajectory 516 which stays far from obstacle 512 more than necessary, due to a safety margin 514. However, using sensing additional knowledge on the obstacle positions can be achieved, hence allowing to reduce the size of the safety margins 514, 515.

Figure 5B:
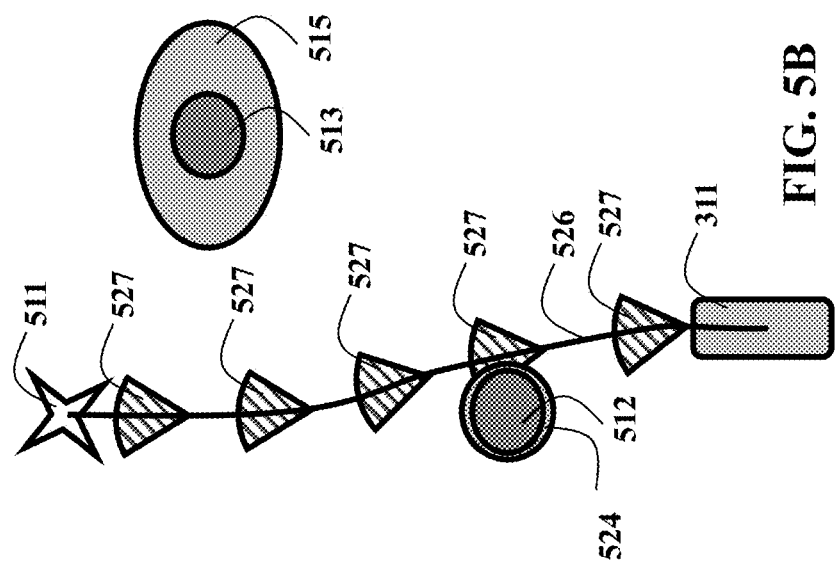
FIG. 5B is a schematic of the results of the operation of the controller according to the embodiments when the controller operates a vehicle to reach a target position while avoiding constraints imposed by collision avoidance, where the constraints are enlarged due to uncertainty of the environment and the controller takes action to reduce such uncertainty when the constraints limit its desired behavior, according to some embodiments.
Figure 5C:
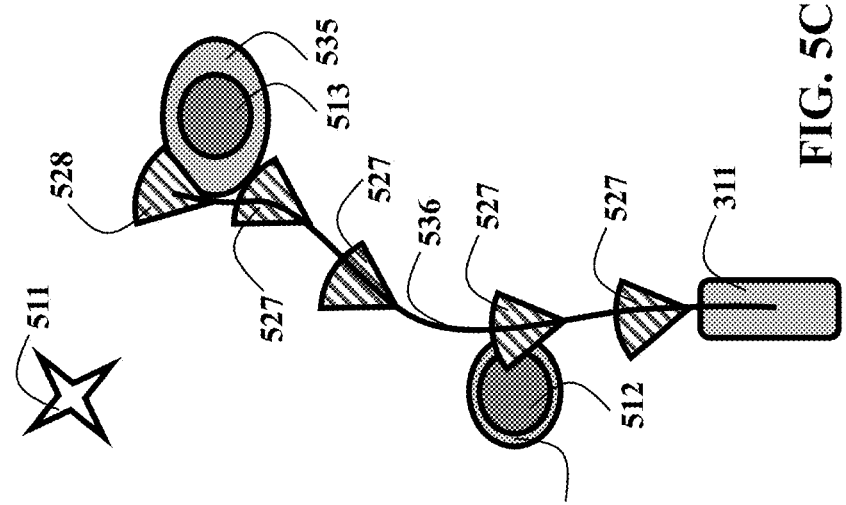
FIG. 5C is a schematic of the results of the operation of the controller according to some embodiments when the controller operates a vehicle to reach a target position while avoiding constraints imposed by collision avoidance, where the constraints are enlarged due to uncertainty of the environment and the controller takes action to reduce such uncertainty based on optimizing a joint cost function of vehicle performance and uncertainty reduction, without restrictions imposed by the embodiments of the present disclosure.

For instance, in FIG. 5B for planning trajectory 526, the sensors with range 527 can acquire more information on obstacle 514, resulting in the smaller safety margin area to be avoided 524. In this way, the trajectory to the goal is straighter. However, if the goal of acquiring knowledge on the environment is treated equally to the goal of reaching the goal position, the control commands may generate trajectory 536 in FIG. 5C, which deviates from the straight line to the goal position 511, in order to bring obstacle 513 in the sensor range 527 to reduce the safety margin 515 to 535. This, however, does not improve the performance in achieving the goal, and on the contrary, it damages it resulting in a less straight trajectory. In fact, the machine may even be prevented from achieving goal 511, and rather stop in an intermediate position 538 that is close to the goal, but not at the goal, but from where it can continue to acquire information on obstacle 513.

Thus, some embodiments use interdependent but imbalanced control and knowledge acquisition where the acquiring knowledge on the environment is not considered as equal to achieving the control goal, but rather it is considered that the acquiring of the knowledge, and hence the reduction of the uncertainty, on the environment is subordinate to the achieving the machine goal, and it is mainly performed to better achieve such goal. In this disclosure, the amount of knowledge on the environment is included in constraints that limit the operation of the machine, where more knowledge corresponds to a smaller safety margin, that is, more permissive constraints. Thus, acquiring more knowledge on the machine causes a reduction of the safety margin of the constraints and allows for the machine to have a more admissible trajectory to reach the goal. However, the trajectory is planned for acquiring more information on the environment only if the reduction of the margin provides a better trajectory to the goal, such as for reducing the margin 514 into 524 for planning trajectory 526. Instead, the trajectory does not attempt acquiring more information on the environment if the reduction of the margin subsequent to the increased knowledge does not provide a better trajectory to the goal, such as for reducing the margin 515, into 535 for planning trajectory 526.

Exemplary Controller Architecture

Figure 6A:
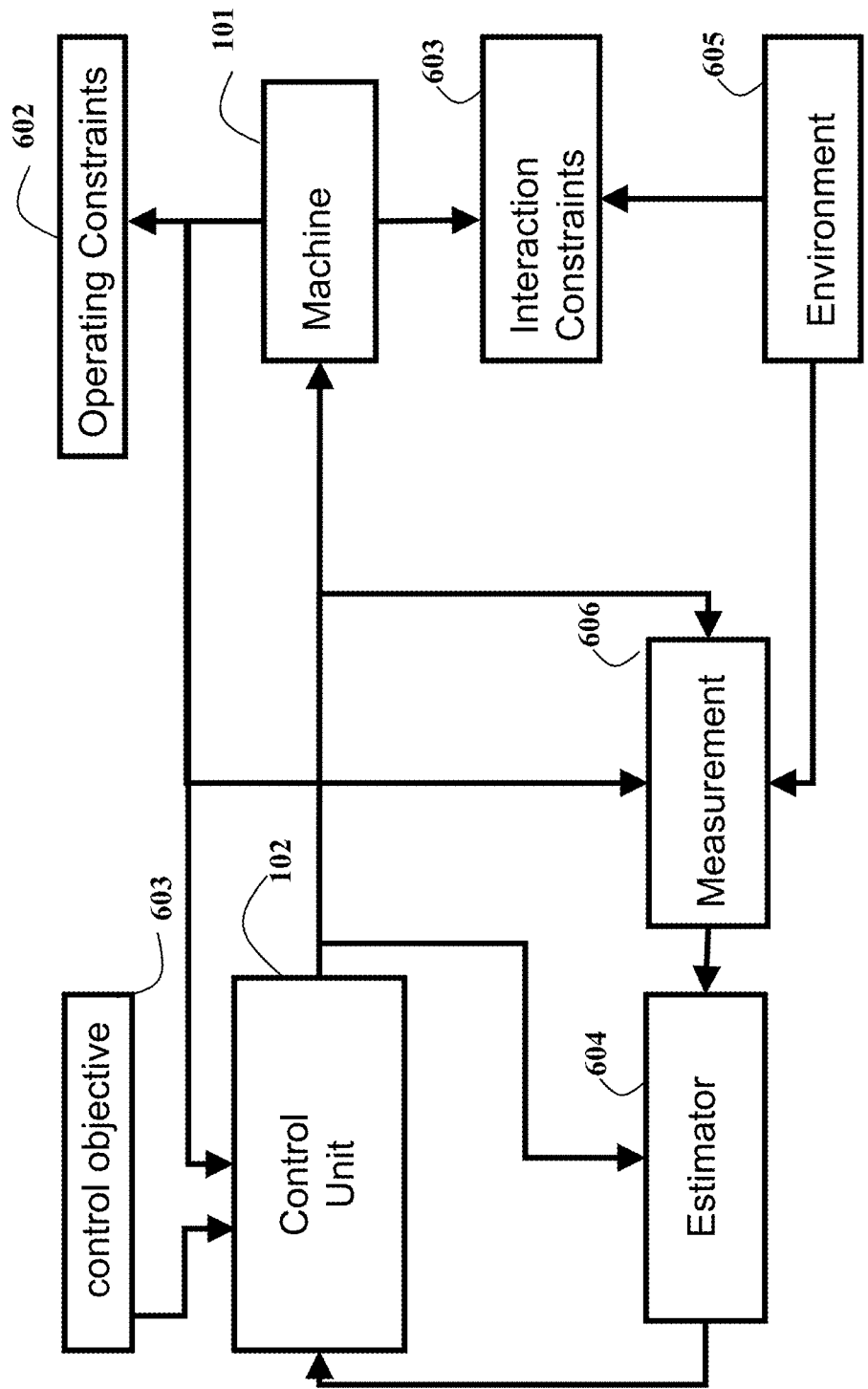
FIG. 6A is a block diagram of the controller for controlling the machine operating in the environment that is discovered by sensing according to some embodiments.

FIG. 6A shows a block diagram of controller 102 for controlling machine 101 according to some embodiments. Model of machine 101 is known and have dynamics described by a known function such as a discrete-time update equation, $$x_{k+1}^s = f^s(x_k^s, u_k^s) \quad (1a)$$

$$y_k^s = g^s(x_k^s, u_k^s) \quad (1b)$$

where $x^s$ is the internal state of the machine, which is known, $u^s$ is the command 604 that is issued by the control unit 112, and $y^s$ is the performance output of the machine, i.e., the signal that must achieve a specific goal. The operating requirements on the machine are described by operating constraints 602 on the machine state and command $$h^s(x^s, u^s) \leq 0 \quad (2)$$

The machine has a control objective 603, such as the output $y^s$ reaching a position or tracking a reference signal $r^s$, $$y_k^s \rightarrow r_k^s \quad (3)$$

Machine 101 operates in an environment 103 which is not perfectly known, but information on it can be acquired from sensing to improve the knowledge about it. In some embodiments of the present invention, the equations describing the dynamics of the environment 605 are known and modeled by $$x_{k+1}^e = f^e(x_k^e, w_k^e) \quad (4)$$

where $x^e$ is the environment state, which collects all relevant data about the environment, from the perspective of its impact on the machine 101. Even though the equations of (4) may be known, the environment state $x^e$ is not directly known. Furthermore, the model of the environment may be affected by an unknown disturbance $w^e$, which may cause changes in the environment state and is not known to the controller. The information on the environment is obtained from measurements 606 $y^e$ acquired by sensors 104, $$y_k^e = g(x_k^e, v_k^e, x_k^s, u_k^s) \quad (5)$$

where $v^e$ is an unknown noise that corrupts the measurements, and where we notice that the measurement depends on the current state of the machine, and possibly also on the current command of the machine.

In some embodiments of the present disclosure, the state of the machine $x^s$ may affect the quality of the measurement, for instance by reducing the amount of corruption of the measurement caused by the noise. For instance, the measurement can be described by the equation $y_k^e = C^e x_k^e + \|E^e x_k^e - E^e x_k^s\|^2 v_k^e$ where the noise corrupting the measurement increases with the distance of the machine state from the environment state.

Some embodiments are based on the realization that the controller may provide sensing instructions to the sensor that change the amount of knowledge acquired by the sensor on the environment or parts of it. For example, the knowledge of a certain area of the environment can be acquired by focusing the sensor on the area of interest without changing the state of the machine. However, the decision on where to focus the sensor does not change the state of the machine. As a result, some embodiments define control inputs that do not affect the change of the state of the machine but only affect the amount of acquired knowledge on the environment or parts of it and include them in the optimization of the control commands.

To that end, in some of the embodiments of the present disclosure, some elements of the machine command $u^s$ do not affect directly the motion of the machine but affect the quality of the measurement. For instance, the measurement can be described by the equation $y_k^e = C^e x_k^e + (1-[u_k^s]_d)^2 v_k^e$ where $[u_k^s]_d$ is the $d^{th}$ component of command $u_k^s$, $[u_k^s]_d$ has a range between 0 and 1, and $[u_k^s]_d$ does not affect the machine (1). In this case, the noise corrupting the measurement can be decreased by increasing $[u_k^s]_d$. For instance, these may represent the capability of focusing a sensor more on a certain area at a certain time, or to operate additional processing on certain measurements to improve their quality, for instance by correcting for the corruption of the measurement due to noise.

Accordingly, in some implementations, a set of commands defined by the control inputs includes a command related to the sensing instructions having no effects on the state of the machine, while changing the amount of knowledge acquired from the environment.

Some embodiments are based on the realization that the constraints on admissible values of the states and the control inputs can be represented as a chance constraint defining in a positive manner the acquired known environment as a state of the environment and the unknown environment as an uncertainty of the state of the environment. For example, the measurements used in an estimator 604 produce an estimate of the state of the environment $\hat{x}_k^e$ and of its uncertainty $\hat{\Sigma}_k^e$ $$(\hat{x}_{k+1}^e, \hat{\Sigma}_{k+1}^e) = e(\hat{x}_k^e, \hat{\Sigma}_k^e, x_k^s, u_k^s, y_k^e). \quad (6)$$

The uncertainty of the estimator is the inverse of the knowledge of the environment state $\hat{\Sigma}_k^e = (\mathcal{K}_k^e)^{-1}$, that is, the more uncertainty there is on the environment state estimate, the less knowledge there is on the environment state. Similarly, the uncertainty of the estimate is the inverse of the reliability of the estimate $\hat{\Sigma}_k^e = (\mathcal{R}_k^e)^{-1}$, that is, the more uncertainty, the less reliable the estimate of the environment state is. The information is the change in knowledge $\mathcal{I}_k^e = (\mathcal{K}_{k+1}^e - \mathcal{K}_k^e)$ between two consecutive steps.

In some embodiments of this disclosure, it is realized that the estimator (6) can be constructed as a dynamic observer $$\hat{x}_k^e = f^e(\hat{x}_{k-1}^e, \overline{w}_{k-1}^e) - L(x_k^s, u_k^s)(y_k^s - g(\hat{x}_k^e, \overline{v}_k^e, x_k^s, u_k^s)) \quad (7a)$$

$$\hat{\Sigma}_k^e = \mathcal{F}(\hat{\Sigma}_{k-1}^e, f^e, L(x_k^s, u_k^s), x_k^s, u_k^s, \Sigma^w, \Sigma^v) \quad (7b)$$

where $L(x_k^s, u_k^s)$ is the observer gain, which may depend on machine state and command $\Sigma^w$, $\Sigma^v$ are the uncertainties on disturbance and noise, for instance, their covariances, and $\overline{w}_{k-1}^e$, $\overline{v}_k^e$ are their nominal values, for instance, their means. The function $\mathcal{F}$ depends on the distributions and the environment dynamics, for instance for linear equations of the environment dynamics and Gaussian disturbances $$\mathcal{F} = (A^e + C^e(x_k^s, u_k^s)L(x_k^s, u_k^s))\Sigma_{k-1}^e(A^e + C^e(x_k^s u_k^s)L(x_k^s, u_k^s))' + (\Sigma_k^w + L(x_k^s, u_k^s)\Sigma_k^v L(x_k^s, u_k^s)') \quad (8)$$

The environment imposes constraints on the machine represented as the interaction constraints 603

$$h(x_k^e, x_k^s, u_k^s) \leq 0 \quad (9)$$

which the controller must satisfy in face of the uncertainty. In some embodiments, the function h is referred to as an interaction function.

In such a manner, the uncertainty of a state of the environment is an inverse of the acquired knowledge of the environment and the constraints imposed on the admissible values of the states and the control inputs include an interaction constraint of variables allowed to interact, the variables including the state of the machine, the state of the environment, and the control inputs, such that the multivariable constrained optimization is subjected to satisfy the interaction constraints in presence of the uncertainty of the state of the environment.

Exemplary Control Unit Operations

Figure 6B:
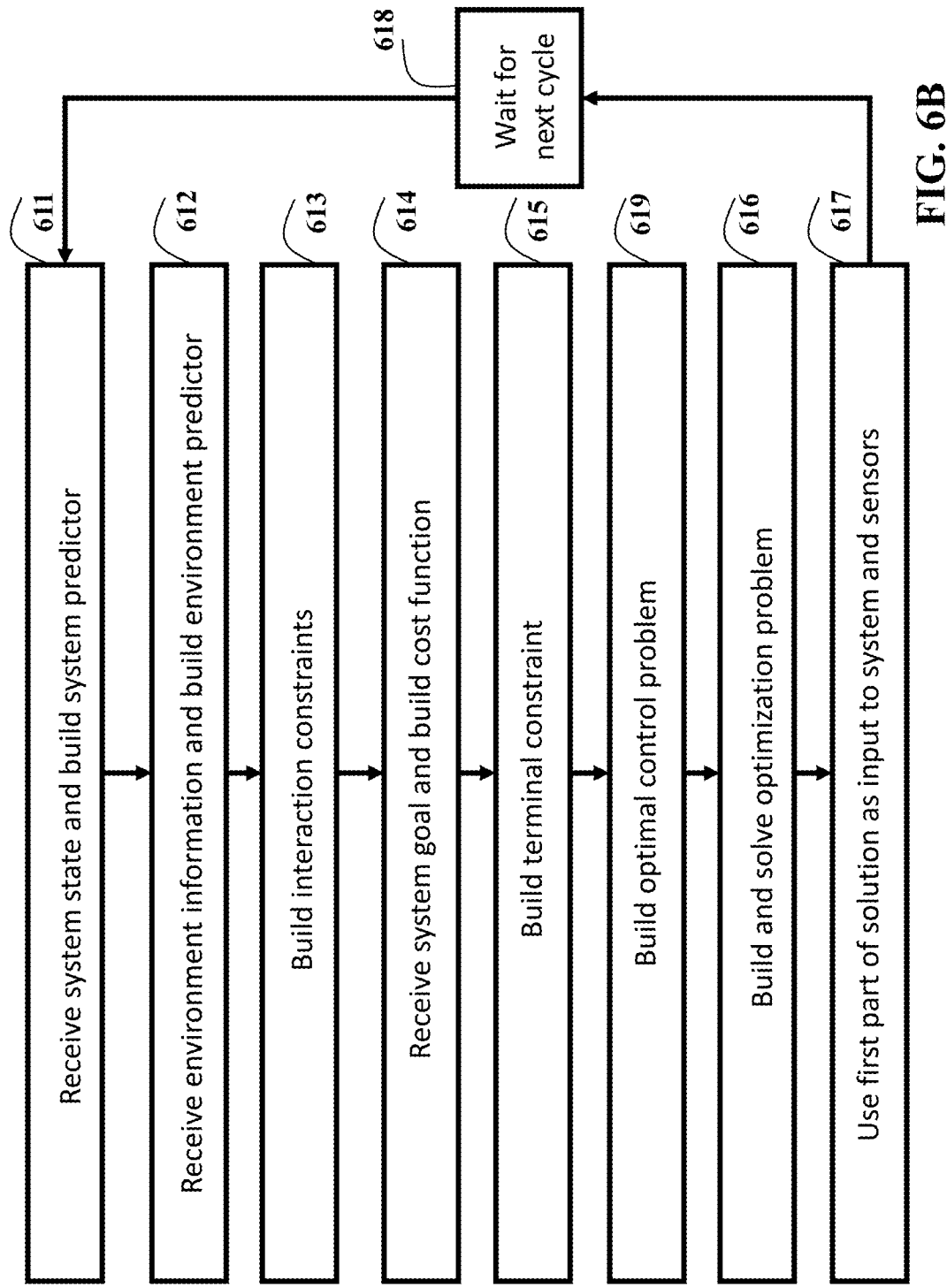
FIG. 6B is a flow diagram of the iterative operations of the control unit according to some embodiments.

In some embodiments, the controller is configured to estimate the environment and the uncertainty of the state of the environment recursively based on a model of dynamics of the state of the environment. For example, the control unit 112 operates iteratively in control cycles, as described in FIG. 6B. At a control cycle k, the control unit receives 611 the machine state $x_k^s$. Then, the control unit builds a machine predictor based on the machine model (1), the machine operating constraints (2) and initializes the model at the current machine state $x_k^s$ $$x_{h+1|k}^s = f(x_{h|k}^s, u_{h|k}^s)$$

$$y_k^s = g(x_{h|k}^s, u_{h|k}^s)$$

$$h(x_{h|k}^s, u_{h|k}^s) \quad (10)$$

Figure 7:
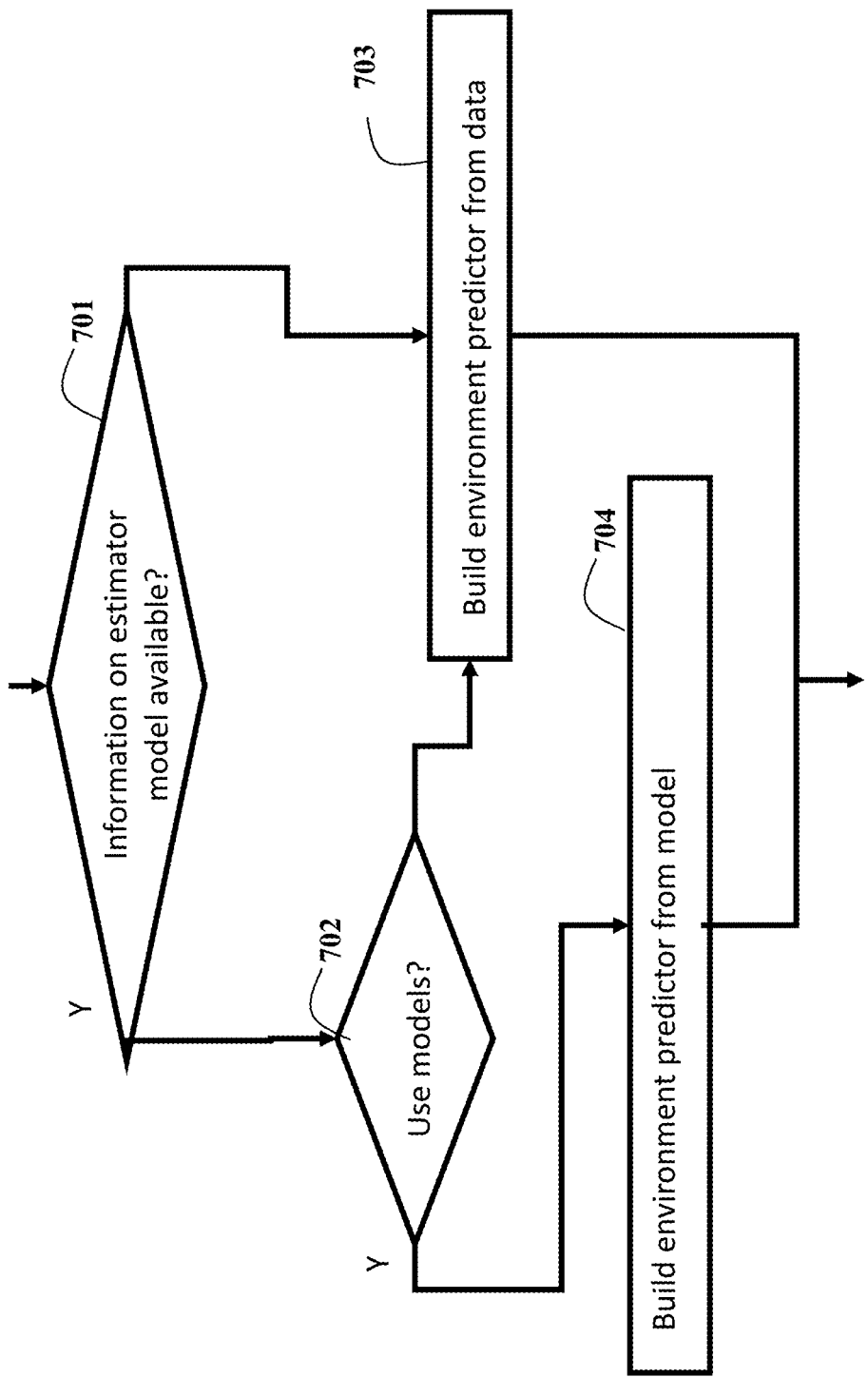
FIG. 7 is a flow diagram of the construction of the predictor model used by the control unit for controlling the machine according to some embodiments, where the effect of the environment and its uncertainty is accounted for by constraints on the operation of the machine that are enforced by the control unit.

The control unit receives 612 from the estimator the current estimate of the state of the environment $\hat{x}_k^e$ and of its uncertainty $\hat{\Sigma}_k^e$. Then, the control unit builds a predictor for the state of the environment $\hat{x}_k^e$ and of its uncertainty $\hat{\Sigma}_k^e$, as shown in FIG. 7.

In some embodiments, if 701 the model of the estimator (6) is known to the control unit, and if 702 the control unit uses such model the predictor can be built based on such model 703. For instance, in the case of (7) the control unit builds the predictor $$\hat{x}_{h+1|k}^e = f^e(\hat{x}_{h|k}^e, \overline{w}_{h|k}^e) - L(x_{h|k}^s, u_{h|k}^s)(\mathcal{Y}_{h|k}^s - g(\hat{x}_{h|k}^e, \overline{v}_{h|k}^e, x_{h|k}^s, u_{h|k}^s))\hat{\Sigma}_{h+1|k}^e = \mathcal{F}(\hat{\Sigma}_{h|k}^e, f^e, L(x_{h|k}^s, u_{h|k}^s), x_{h|k}^s, u_{h|k}^s, \Sigma^w, \Sigma^v) \quad (11a)$$

In some embodiments of the present invention, the model of the estimator (6) may not be known, or the control unit may decide not to use it, for instance, due to excessively heavy computations. One exemplar embodiment builds 704 the predictor as a function learned from past data. For instance, the function can be learned as a Gaussian Process (GP) model $$[\hat{x}_{j+1}^e(X_j)]_a = [m(X_j)]_a + k_{X_j X}^a(k_{XX}^a + \sigma_a^2 I)^{-1}([Y]_a - [m(X)]_a), [\hat{\Sigma}_{j+1}^e(X_j)]_a = k_{X_j X_j}^a - k_{X_j X}^a(k_{XX}^a + \sigma_a^2 I)^{-1} k_{XX_j}^a, \quad (11b)$$

where $X = [X_0, \ldots, X_{M-1}]'$, $Y = [Y_0, \ldots, Y_{M-1}]'$, $X_j = (\hat{x}_j^e, \hat{\Sigma}_j^e, x_j^e, u_j^e, \mathcal{Y}_j^e)$, $Y_j = (\hat{x}_{j+1}^e, \hat{\Sigma}_{j+1}^e)$, $[x]_a$ denotes the a-th component of the vector x, $\sigma_a^2$ is the a-th diagonal term of the noise covariance of the training outputs, $m^a(\cdot)$ is the mean function of the GP prior, and $k_{X_1, X_2}^a = k^a(X_1, X_2)$ is the kernel function, for which many choices are available, the most common being the squared exponential kernel function. In such a manner, in some embodiments, the controller is configured to estimate the environment and the uncertainty of the state of the environment recursively based on a dynamic function trained from data collected while controlling the machine.

As the uncertainty in the predictors (11a) and (11b) depend on the machine state and command, the commands that determine the state trajectory of a machine and the amount of knowledge required of a state of environment surrounding the machine are interdependent.

The predictor is initialized at the current estimate of the state of the environment $\hat{x}_k^e$ and of its uncertainty $\hat{\Sigma}_k^e$.

$$\hat{x}_{0|k}^e = \hat{x}_k^e, \hat{\Sigma}_{0|k}^e = \hat{\Sigma}_k^e \quad (11c)$$

Some embodiments are based on the realization that if the constraint on the admissible values of the state of control inputs can be partitioned as two parts, current knowledge of the state of the environment and uncertainty on such knowledge, such a representation can be advantageously captured by probabilistic constraints with a mean representing the current or acquired knowledge of the environment and a variance representing the uncertainty of the knowledge of the environment. Such a probabilistic representation allows using various probabilistic techniques in the iterative multivariable constrained optimization. Hence, the control unit builds 613 the interaction constraints (9) from the predicted state of the environment and its uncertainty.

However, it was further recognized, that since the environment is not perfectly known, the interaction constraint (9) may not be always satisfied. Instead of using only the estimate of the environment state $\hat{x}_k^e$ in (9), it is realized that satisfying the constraints with assigned confidence despite uncertainty in the estimate of the environment is possible when both the estimate of the environment state $\hat{x}_k^e$ and its uncertainty $\hat{\Sigma}_k^e$, representing the deterministic component and the uncertainty component of the knowledge on the environment, respectively, are used for constructing the constraints. In particular, while the estimate is used in (9) in the role of the actual value of the environment state, which is not known, the uncertainty component determines how much additional safety margin must be left in the constraint-based on how reliable the current knowledge of the environment is.

For example, the state of the environment is a first moment and the uncertainty of the environment is a second moment of a probabilistic distribution of an estimate of the state of the environment, such that a monotonically increasing function of the second moment defines a confidence for satisfying the interaction constraint.

For example, based on predictors (11a), (11b), one embodiment modifies the constraint (9) to obtain the uncertainty-dependent tightened interaction constraint that depends on the estimate of the environment and its uncertainty from (6), $$h(\hat{x}_{h|k}^e, x_{h|k}^s, u_{h|k}^s) \leq -\gamma(\hat{\Sigma}_{h|k}^e) \quad (12)$$

where the function $\gamma$ makes the constraint more stringent, to account for the possible error in the predicted environment state estimate $\hat{x}_{h|k}^e$ based on how likely such errors may occur, that is based on the estimated uncertainty. The function $\gamma$ is monotonically increasing with respect to a metric of $\hat{\Sigma}_{h|k}^e$, such as its norm.

Since the uncertainty-dependent tightened interaction constraint (12) depends on the predicted uncertainty the knowledge acquired of a state of environment surrounding the machine and commands that determine the state trajectory of a machine are interdependent.

As the uncertainty in the predictors (11a) and (11b) depend on the machine state and command, the commands that determine the state trajectory of a machine and the amount of knowledge required of a state of environment surrounding the machine are interdependent.

In particular, some embodiments are based on the realization that if the initial state of the environment is described by a probability distribution) $p_{x_{0|k}}^e (x_{0|k}^e)$, and if the disturbance w and the noise v are also described by probability distributions, $p_v$ (v), $p_w$ (w) the environment state estimate $\hat{x}_{h|k}^e$ and of its uncertainty $\hat{\Sigma}_{h|k}^e$ are the mean and the covariance of a probability distribution of the environment state estimate $p_{x_{h|k}}^e (x_{h|k}^e)$.

Then, the function $\gamma$ can be designed so that satisfying (8) guarantees the satisfaction of (7) with a confidence 1-r, $$h(\hat{x}_{h|k}^e, x_{h|k}^s, u_{h|k}^s) \leq -\gamma(\hat{\Sigma}_{h|k}^e) \Rightarrow \mathbb{P}\ [h(x_{h|k}^e, x_{h|k}^s, u_{h|k}^s) \leq 0] \geq 1-\rho \quad (13)$$

For that, the function $\gamma$ can be defined as $$\gamma(\hat{\Sigma}_{h|k}^e) = \alpha \cdot \sqrt{\frac{\partial h'}{\partial x_{h|k}^e} \hat{\Sigma}_{h|k}^e \frac{\partial h}{\partial x_{h|k}^e}} \quad (14)$$

where $$\frac{\partial h}{\partial x^e}$$

is the sensitivity of the constraint with respect to the environment state and $\alpha$ is a coefficient computed from the probability distribution of $p_{x_{h|k}}^e (x_{h|k}^e)$ and the confidence 1-r. For instance, for $p_{x_{h|k}}^e (x_{h|k}^e)$ Gaussian, $\alpha = F_N^{-1} (1-\rho)$, where $F_N^{-1}$ is the standard normal inverse cumulative distribution function, while for a generic distribution $$p_{x_{h|k}^e}(x_{h|k}^e), \alpha = \sqrt{\frac{1-\rho}{\rho}}.$$

In case (9) contains several constraints, the step is repeated for each constraint separately. For the case of linear constraint, $h'_s x_{h|k}^s + \eta'_s x_{h|k}^e \leq b_s$, and linear machine dynamics if $p_{x_{0|k}}^e (x_{0|k}^e)$, $p_v$ (v), $p_w$ (w) are Gaussian, $p_{x_{h|k}}^e (x_{h|k}^e)$ is Gaussian and hence (12) is $$h'_s x_{h|k}^s + \eta'_s \hat{x}_{h|k}^e + F_N^{-1}(1-\rho)\sqrt{\eta'_s \hat{\Sigma}_{h|k}^e \eta_s} \leq b_s. \quad (15)$$

In such a manner, the probabilistic nature of representing a constraint on the state of the environment and its uncertainty includes the following considerations. First, the constraint includes a first part and a second part, the first part defining inadmissible values of the state determined from the acquired knowledge of the surrounding environment, the second part defining additional inadmissible values of the state based on the uncertainty in the knowledge related to the first part, so that the constraints containing both the first and second parts are imposed on the multivariable constraint optimization as probabilistic constraints.

Second, framing the constraint as composed of two parts allows the controller to evaluate whether passing through the additional inadmissible state values would be beneficial for optimizing the state trajectory. For example, the first part defined by the acquired knowledge reliably specifies the inadmissible values that might not be changed. For example, violating this constraint may result in a collision with a neighboring vehicle, a pedestrian, or hitting a side of the road traveled by the vehicle. However, the additional inadmissible values of the state may be potentially available and maybe recalculated if more information or knowledge is acquired. To that end, the controller may decide to acquire more knowledge about the additional inadmissible state values if that knowledge may potentially shrink the additional inadmissible state values and improve the state trajectory.

Third, if the constraint on the admissible values of the state of control inputs can be partitioned as two parts, current knowledge of the state of the environment and uncertainty on such knowledge, such a representation can be advantageously captured by probabilistic constraints with a mean representing the current knowledge of the environment and a variance representing the uncertainty of the knowledge of the environment. Such a probabilistic representation allows using various probabilistic techniques in the iterative multivariable constrained optimization.

For example, when the state of the environment is the first moment and the uncertainty of the environment is the second moment of probabilistic distribution of an estimate of the state of the environment, such that a monotonically increasing function of the second moment defines confidence for satisfying the interaction constraint. In this context, the monotonically increasing function of the second moment of the probabilistic distribution of an estimate of the state of the environment is based on a sensitivity of the interaction constraint with respect to the state of the environment, and a coefficient computed from the probability distribution of the state of the environment and the desired confidence for satisfying the interaction constraint.

Figure 9A:
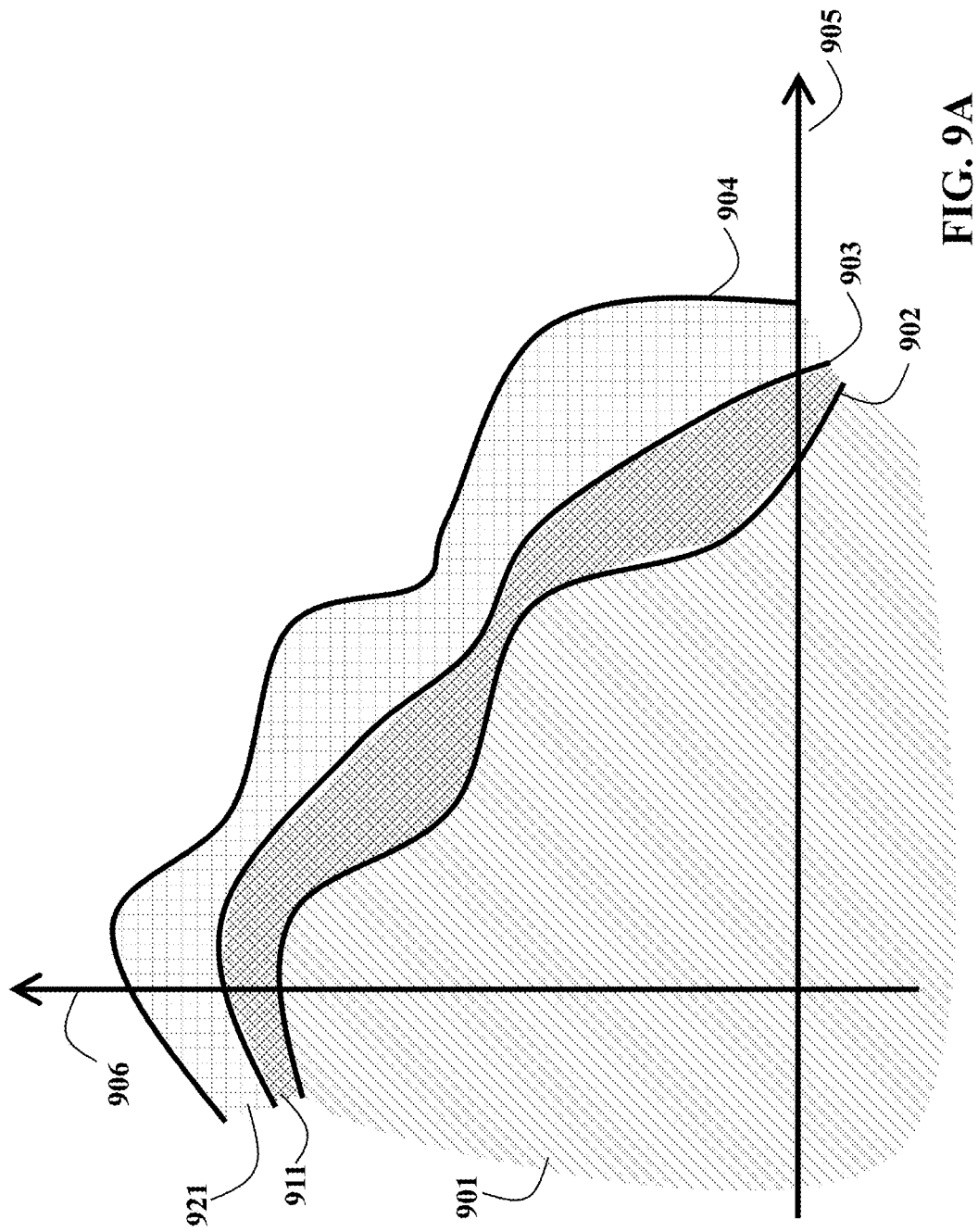
FIG. 9A is a schematic showing the effects of the uncertainty-dependent tightened interaction constraint that reduces the admissible region of the combined machine state space and environment state space based on the uncertainty on the environment state according to some embodiments.

The modification of constraint (9) to obtain constraint (12) is shown in FIG. 9A, where the non-admissible region 901 describes the combinations of values 905 of machine state and of values 906 of environment state that does not satisfy the interaction constraint (9). Such region is enlarged by moving the border 902, by an amount 903 that is obtained by combining the uncertainty of the state of the environment with the sensitivity of the constraint to the state of the environment $\partial h/\partial x^e$ obtaining an enlargement for a unitary confidence interval, resulting in a first additional non-admissible region 911. Then, the non-admissible region is enlarged by moving the border by a further amount 904 obtained by combining the amount of reduction for unitary confidence interval by the coefficient a to obtain the amount of reduction for desired confidence 1-r, resulting in a second additional non-admissible region 921. The additional non-admissible regions 911, 921 make the region where machine 101 cannot operate larger, according to the relation that the larger the uncertainty, the more clearance from the constraints the machine needs, and hence the less space of movement the machine state has.

Figure 9B:
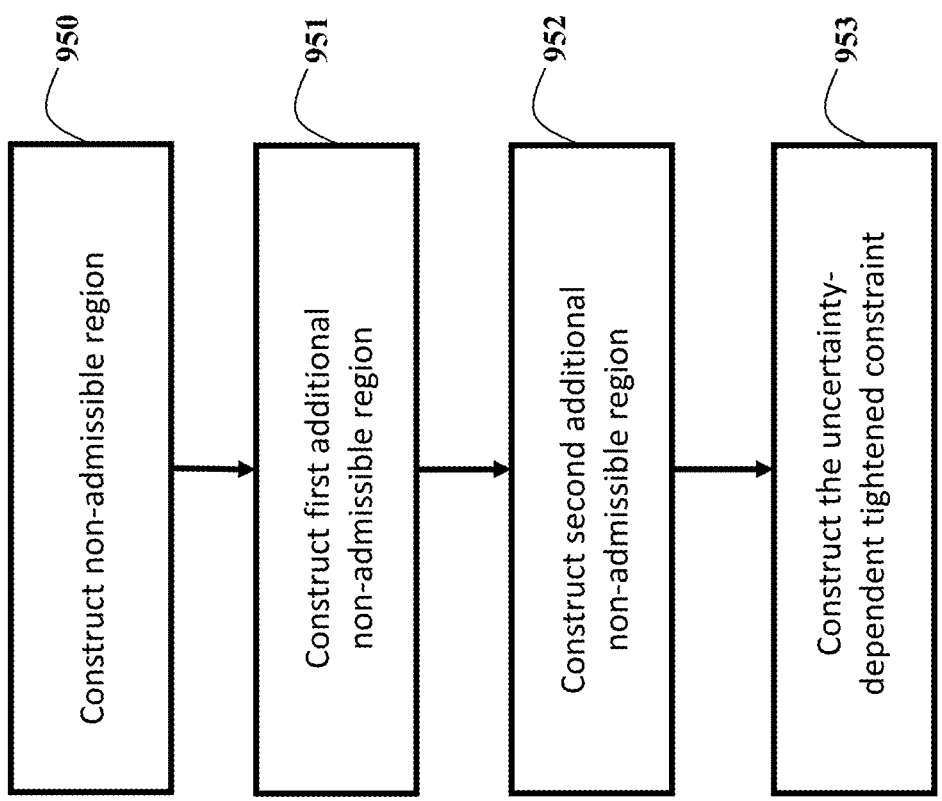
FIG. 9B is a flow diagram of the operation for constructing the uncertainty-dependent tightened interaction constraint according to some embodiments.

FIG. 9B shows the steps to construct the uncertainty-dependent tightened interaction constraint by constructing 951 the non-admissible region which is the complement of the region where the constraint (9) is satisfied, constructing 952 the first additional non-admissible region 911, constructing 952 the second additional non-admissible region 921, and finally constructing 953 the uncertainty-dependent tightened interaction constraint (12) which is the complement of all non-admissible regions 901, 911, 921.

Accordingly, some embodiments determine an admissible region in a space described by combinations of values of the state of machine state and the state of the environment based on knowledge of the environment; determine a reduction coefficient based on the uncertainty of the state of the environment and the sensitivity of the constraints with respect to the state of the environment. Next, the embodiments modify the reduction coefficient based on the shape of the distribution of the uncertainty of the state of the environment and the desired confidence for satisfying the constraint, reduce the admissible region in the space described by combinations of values of the state of machine state and the state of the environment based on the modified reduction coefficient, and transform the admissible region into constraints for state and control inputs of the machine being controlled.

In such a manner, the admissible values of the state and the control inputs corresponding to the state of the environment are decreased based on the sensitivity of the interaction constraint to the state of the environment. Additionally or alternatively, the range of admissible values of the state and the control inputs corresponding to the state of the environment is decreased based on the monotonically increasing function of the uncertainty of the state of the environment.

Exemplar Optimization Techniques

Some embodiments are based on the realization that the acquired knowledge can be improved in one or a combination of two scenarios. In the first scenario, the controller does not make any effort to improve the knowledge of the environment unless this brings direct benefits to the performance of achieving the control objective. In the second scenario, the controller may still improve the knowledge of the environment as long as this does not prevent the achieving the control objective.

Some embodiments are based on the realization that these two scenarios can be balanced by including a stage cost and a terminal cost each including a term proportional to the performance of the state of the machine relative to the control objective and a term proportional to the amount of knowledge of the environment, where the balancing is obtained by non-negative weights multiplying each term. Some embodiments are based on a recognition that the inclusion of the term proportional to the amount of knowledge of the environment in the stage cost and the terminal cost in the cost function may help the case where in the future the control objective is changed because this could require the machine to operate in the previously avoided area where information has not been acquired as it was not relevant to the previous control objectives.

For example, as shown in FIG. 6, the controller receives 614 the current goal of the machine $r^s$ and builds a predictive cost function $$F\left(x_{N|k}^s, r_{N|k}, \hat{\Sigma}_{N|k}^e\right) + \sum_{h=1}^{N-1} \ell^s\left(x_{h|k}^s, u_{h|k}^s, r_{h|k}^s, \hat{\Sigma}_{h|k}^e\right) \quad (16a)$$

where $F(x_{N|k}^s, r_{N|k}, \hat{\Sigma}_{N|k}^e)$ is the terminal cost of the cost function associated with terminal conditions at the end of the prediction horizon N, and $\ell^s (x_{h|k}^s, u_{h|k}^s, r_{h|k}^s, \hat{\Sigma}_{h|k}^e)$ is the stage cost of the cost function, controlled by optimized control inputs taken along the prediction horizon N. Additionally or alternatively, the cost function can be decomposed as $$F^s\left(x_{N|k}^s, r_{N|k}\right) + F^e(\hat{\Sigma}_{N|k}^e) + \sum_{h=1}^{N-1} \ell^s\left(x_{h|k}^s, u_{h|k}^s, r_{h|k}^s\right) + \ell^e(\hat{\Sigma}_{h|k}^e) \quad (16)$$

where is $\ell^s (x_{h|k}^s, u_{h|k}^s, r_{h|k}^s)$ and $F^s (x_{N|k}^s, r_{N|k}^s)$ are the performance terms of the stage cost and the terminal control, respectively, that reduce as the machine moves closer to the goal, and $\ell^e (\hat{\Sigma}_{h|k}^e)$ and $F^e (\hat{\Sigma}_{N|k}^e)$ are the environment terms of the stage cost and the terminal control, respectively, that reduce as the uncertainty of the state of the environment reduces. For instance, the stage cost may be always greater than or equal to 0 and may have a value 0 when, and sometimes only when, the goal is achieved.

In such a manner, the cost function includes a stage cost that computes the cost incurred along a prediction horizon by a sequence of control decisions taken along the prediction horizon, a terminal cost that computes the cost associated to the terminal conditions at the end of the prediction horizon, wherein each of the stage cost and terminal cost contains one term related to the performance of the state of the machine relative to the control objective and a term proportional to the amount of knowledge of the environment, where the balancing between these terms is obtained by non-negative weights multiplying each term.

The performance term of the terminal cost $F^s (x_{N|k}^s, r_{N|k}^s)$ ensures convergence to the goal. For instance, the performance term of the terminal cost and of the stage cost may be always greater than or equal to 0 and may have a value 0 when, and sometimes only when, the goal is achieved, and satisfy the cost decrease condition $$F^s(x_{N|k}^s, r_{N|k}^s) \geq F^s(x_{N|k+1}^s, r_{N|k+1}^s) + \ell^s(x_{h|k}^s, u_{h|k}^s, r_{h|k}^s) \quad (17)$$

for some command $u_k^s$ that satisfies the operating and interaction constraints.

The performance stage cost and terminal cost may be defined by quadratic functions $$\ell^s(x_{h|k}^s, u_{h|k}^s, r_{h|k}^s) = (x_{h|k}^s - M_x^s r_{h|k}^s)'Q^s(x_{h|k}^s - M_x^s r_{h|k}^s) + (u_{h|k}^s - M_u^s r_{h|k}^s)'R_u^s(u_{h|k}^s - M_u^s r_{h|k}^s) \quad (18a)$$

$$F^s(x_{h|k}^s, r_{h|k}^s) = (x_{h|k}^s - M_x^s r_{h|k}^s)'P^s(x_{h|k}^s - M_x^s r_{h|k}^s) \quad (18b)$$

where $P^s$, $Q^s$, $R^s$ are positive semidefinite symmetric weight matrices and $M_x^s$, $M_u^s$ are matrices that map the machine goal to the control objective, that is the uniquely determined target state and command where the machine goal is achieved.

The environment term of the stage cost $\ell^e(\hat{\Sigma}_{h|k}^e)$ and terminal cost $F^e(\hat{\Sigma}_{N|k}^e)$ promote reducing uncertainty in the environment. For instance, $$F^e(\hat{\Sigma}_{N|k}^e) = S_N \|\hat{\Sigma}_{N|k}^e - \Sigma_{N|k}^e\|_{\mathcal{F}}^2 \quad \ell^e(\hat{\Sigma}_{h|k}^e) = S_\ell \|\hat{\Sigma}_{h|k}^e - \Sigma_{h|k}^e\|_{\mathcal{F}}^2 \quad (19)$$

where $\|\cdot\|_{\mathcal{F}}$ is the Frobenious norm, $S_N$, $S_\ell$ are nonnegative weights, and $\Sigma_k^e$ is the environment uncertainty objective that corresponds to the control objective, or alternatively $$F^e(\hat{\Sigma}_{N|k}^e) = S_N tr(\hat{\Sigma}_{N|k}^e - \Sigma_{N|k}^e)^2 \quad \ell^e(\hat{\Sigma}_{h|k}^e) = S_\ell \, tr(\hat{\Sigma}_{h|k}^e - \Sigma_{h|k}^e)^2 \quad (20)$$

where tr is the matrix trace operator.

In some embodiments, it is realized that in order to obtain interdependent but imbalanced control and knowledge acquisition, the environment term of the stage cost and of the terminal cost are to be set to 0 in order to prevent that the objective of acquiring knowledge on the environment causes the machine not to achieve its goal. For instance, $S_N$, $S_\ell$ weights can be set to 0. In this way, the control unit does not make any effort to improve the knowledge of the environment unless this brings direct benefits to the performance of achieving the goal. In some embodiments of this invention, it is further realized that it may still be beneficial to improve the knowledge of the environment as long as this does not prevent the achieving the goal, and that imbalanced control and knowledge acquisition that achieves the goal while improving knowledge on the environment can still be achieved for non-zero weights $S_N$, $S_\ell$ of environment term of the stage cost $\ell^e(\hat{\Sigma}_{h|k}^e)$ and of the terminal cost $F^e(\hat{\Sigma}_{N|k}^e)$ if these satisfy the condition $$F^e(\hat{\Sigma}_{N|k}^e) \geq \ell^e(\hat{\Sigma}_{N|k}^e) + F^e(\hat{\Sigma}_{N|k+1}^e) \quad (21)$$

while the condition on the cost decrease condition (17) is still satisfied.

In some embodiments of the present disclosure, the control unit enforces condition (21) by selecting $S_N$, $S_\ell$ weights to be small compared to $P^s$, $Q^s$, $R^s$ and by determining the predictor to guarantee that the Frobenious norm of the environment uncertainty matrix is contracting $$\|\hat{\Sigma}_{N|k+1}^e\|_{\mathcal{F}} \leq \|\hat{\Sigma}_{N|k}^e\|_{\mathcal{F}} \quad (22)$$

that is, the estimator is predicted to reduce the uncertainty at every step.

Accordingly, in some embodiments, the cost function includes a stage cost that computes the cost incurred along a prediction horizon by a sequence of control decisions taken along the prediction horizon, a terminal cost that computes the cost associated to the terminal conditions at the end of the prediction horizon, wherein each of the stage cost and terminal cost contains one term related to the performance of the state of the machine relative to the control objective and a term proportional to the amount of knowledge of the environment, where the balancing between these terms is obtained by non-negative weights multiplying each term.

One embodiment selects the second scenario when possible as more reliable. To that end, the embodiment selects the first scenario only when it is not possible or at least not likely to ensure progress towards the control objective according to the second scenario. Hence, in this embodiment, the controller check a satisfaction of a condition of expected progress towards the control goal and selects weights of the environment term of the state and terminal costs to be zero when the condition cannot be guaranteed to be satisfied and, otherwise, select weights of the uncertainties of the state and terminal costs to satisfy the condition. The condition of expected progress is based on the comparison of the next term of the terminal cost related to the uncertainty in the environment and the term of the stage cost related to the uncertainty in the environment for a horizon equal to one, be smaller than the term related to the uncertainty in the environment of the past terminal cost.

Figure 8:
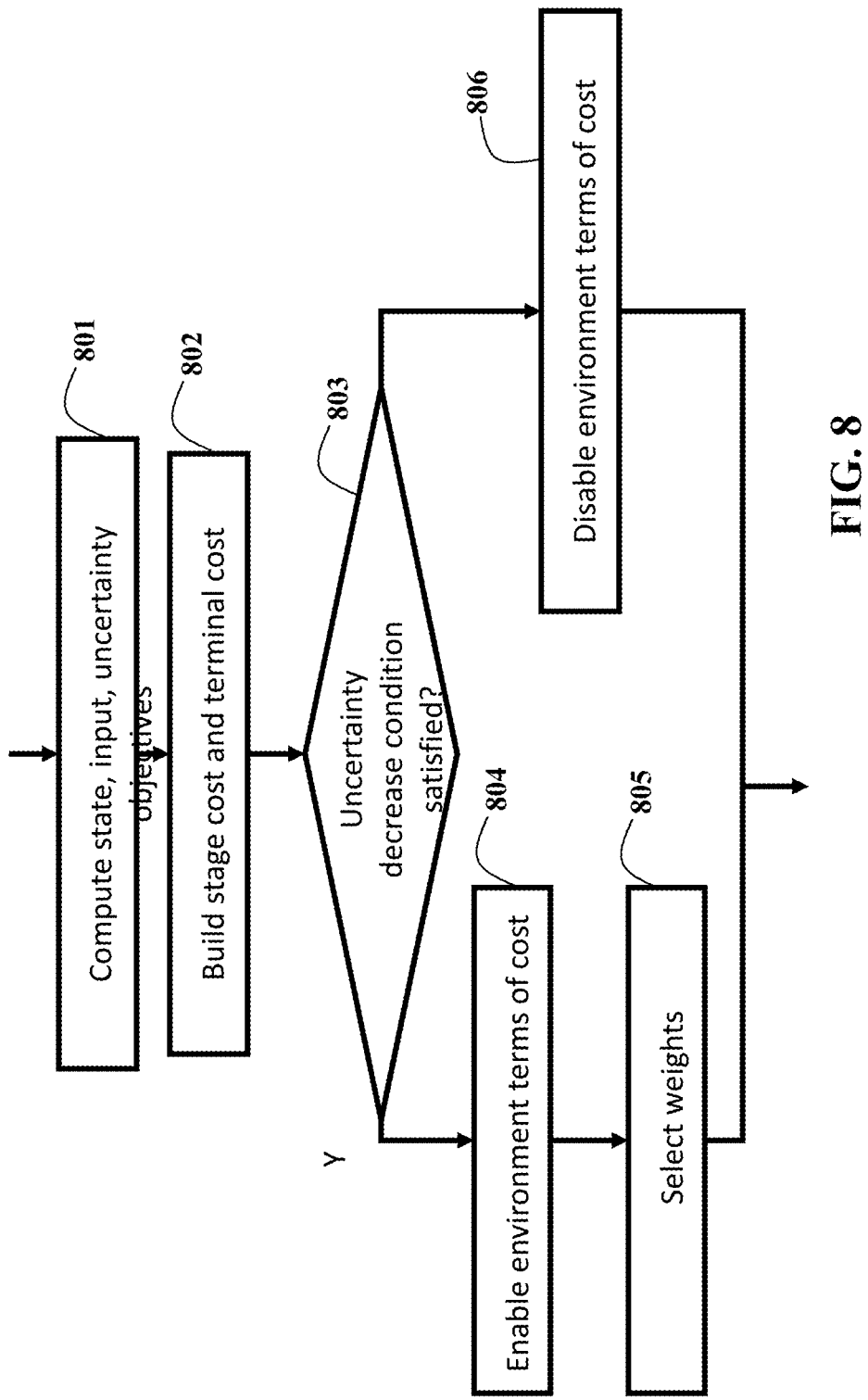
FIG. 8 is a flow diagram of the construction of the cost function used by the control unit for controlling the machine according to some embodiments, where the effect of the environment and its uncertainty is accounted for by constraints on the operation of the machine that are enforced by the control unit.

Thus, according to FIG. 6 of some embodiments, the control unit builds 614 the cost function according to the steps in FIG. 8. From the machine goal, the control unit builds 801 the control objective state, the control objective command, and the environment uncertainty objective that corresponds to the machine goal. For instance, the environment uncertainty objective can be computed by solving a Lyapunov equation determining the equilibrium for the second moment of the distribution of the environment state when the machine states and commands are fixed to the ones that achieve the machine goal.

Then, the control unit builds 802 the performance term of the stage cost and performance term of the terminal cost by selecting $P^s$, $Q^s$, $R^s$ according to (17). If 803 the condition (21) can be satisfied, the environment terms of the stage cost and terminal cost are enabled 804 by and $S_N$, $S_\ell$ weights are selected 805 to satisfy (21). Otherwise, the environment terms of the stage cost and terminal cost are disabled 806 by setting $S_N$, $S_\ell$ to 0.

The control unit builds 615 a terminal constraint $$h_N(x_{N|k}^s, r_{N|k}^s, \hat{x}_{N|k}^e, \hat{\Sigma}_{N|k}^e) \leq 0 \quad (23)$$

that is admissible, i.e., if (23) is satisfied, then the operation constraints (2) and the interaction constraints (9) are also satisfied, and that is controlled invariant for commands satisfying (17), i.e., if (23) is satisfied, there exists $u_{N-1|k+1}^s$ satisfying (23) such that $$h_N(x_{N|k+1}^s, r_{N|k+1}^s, \hat{x}_{N|k+1}^e, \hat{\Sigma}_{N|k+1}^e) \leq 0$$

when $r_{N|k+1}^s = r_{N|k}^s$, $\hat{x}_{N|k+1}^e = \hat{x}_{N|k}^e$, $\hat{\Sigma}_{N|k+1}^e = \hat{\Sigma}_{N|k}^e$. For the special case of linear models of a machine subject to linear constraints (15), it is enough that $$r_{N|k+1}^s = r_{N|k}^s, \eta'_s \hat{x}_{N|k+1}^e + F_N^-(1-\rho)$$
$$\sqrt{\eta'_s \hat{\Sigma}_{N|k+1}^e \eta_s} \leq \eta'_s \hat{x}_{N|k+1}^e + F_N^-(1-\rho)\sqrt{\eta'_s \hat{\Sigma}_{N|k}^e \eta_s}$$

Then using the machine predictor (10) the environment predictor (11a) or (11b) with initialization (11c), the interaction constraints (12), the cost function (16), and the terminal constraint (23) the control unit builds 619 an optimal control problem $$\min F^s(x_{N|k}^s, r_{N|k}^s) + F^e(\hat{\textstyle\sum}_{N|k}^e) + \sum_{h=1}^{N-1} \ell^s(x_{h|k}^s, u_{h|k}^s, r_{h|k}^s) + \ell^e(\hat{\textstyle\sum}_{h|k}^e)$$

$$\text{s.t.} \quad \begin{aligned} & x_{k+1|h}^s = f^s(x_{h|k}^s, u_{h|k}^s) \\ & y_k^s = g(x_{h|k}^s, u_{h|k}^s) \\ & x_{0|k}^s = x_k^s \\ & \left(\hat{x}_{k+1|h}^e, \hat{\textstyle\sum}_{k+1|h}^e\right) = e\left(\hat{x}_{k|h}^e, \hat{\textstyle\sum}_{k|h}^e, x_{k|h}^s, u_{k|h}^s, y_{k|h}^e\right) \\ & \hat{x}_{0|k}^e = \hat{x}_k^e, \hat{\textstyle\sum}_{0|k}^e = \hat{\textstyle\sum}_k^e \\ & h(\hat{x}_{h|k}^e, x_{h|k}^s, u_{h|k}^s) \leq -\gamma(\hat{\textstyle\sum}_{h|k}^e) \\ & h_N\left(x_{N|k}^s, r_{N|k}^s, \hat{x}_{N|k}^e, \hat{\textstyle\sum}_{N|k}^e\right) \leq 0 \end{aligned}$$

and from that it builds and solves 616 a single unitary multivariable optimization that jointly determines the state trajectory of the machine and the amount of information to be acquired on the state of environment surrounding the machine $$\min \mathcal{J}\left(\left\{x^s_{h|k}, r^s_{h|k}, r^s_{h|k}, \hat{x}^e_{h|k}, \hat{\Sigma}^e_{h|k}\right\}_{h=0}^{N}, \left\{u^s_{h|k}\right\}_{h=0}^{N-1}\right) \quad (24)$$

$$\mathcal{H}^e\left(\left\{x^s_{h|k}, r^s_{h|k}, r^s_{h|k}, \hat{x}^e_{h|k}, \hat{\Sigma}^e_{h|k}\right\}_{h=0}^{N}, \left\{u^s_{h|k}\right\}_{h=0}^{N-1}\right) = 0$$

$$\mathcal{H}^i\left(\left\{x^s_{h|k}, r^s_{h|k}, r^s_{h|k}, \hat{x}^e_{h|k}, \hat{\Sigma}^e_{h|k}\right\}_{h=0}^{N}, \left\{u^s_{h|k}\right\}_{h=0}^{N-1}\right) \le 0$$

The optimal solution of the problem contains the sequence of optimal commands $\{u_{h|k}^{s*}\}_{h=0}^{N-1}$ for the machine and possibly the sensors along the future horizon of length N cycles. The first part of such command sequence is used 617 as a command for the machine and possibly the sensors at the current control cycle $$u_k = u_{0|k}^{s*} \quad (25)$$

Then, the control unit waits 618 until the next cycle.

Thus, the estimator (6) updates the estimate of the environment state and its uncertainty using $u_k=u_{0|k}^{s*}$, and the machine state changes due to the command $u_k=u_{0|k}^{s*}$ as described by (1).

The above-described embodiments of the present invention can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A controller for controlling an operation of a machine, comprising: at least one processor; and memory having instructions stored thereon that, when executed by the at least one processor, cause the controller to:

acquire information of an environment surrounding the machine by processing measurements of at least one sensor, the at least one sensor sensing the environment based on a state of the machine and sensing instructions controlling an operation of the at least one sensor;

process the acquired information of the environment to estimate a state of the environment and uncertainty of the state of the environment, wherein the state of the environment includes one or more state variables related to the environment;

solve a multivariable constrained optimization of a model of dynamics of the machine, subject to probabilistic constraints on i.) first values of the states of the environment and the machine and ii.) a sequence of control inputs to the machine to determine jointly i.) the sequence of control inputs to the machine, wherein the sequence of control inputs define a state trajectory of the machine and ii.) desired information of the environment, wherein the model of dynamics of the machine relates the state trajectory with the sequence of the control inputs, wherein the probabilistic constraints on the first values of the states of the environment and the machine and the control inputs are defined based on the state of the environment and the uncertainty of the state of the environment, wherein the multivariable constrained optimization optimizes a cost function including:
 a stage cost of the operation of the machine controlled by optimized control inputs taken along a prediction horizon, and
 a terminal cost associated with terminal conditions at end of the prediction horizon, wherein each of the stage cost and the terminal cost includes a performance term related to a performance of the operation of the machine relative to a control objective to be satisfied and an environment term related to the uncertainty of the state of the environment, where balancing between the performance term and the environment term is obtained by weights of each of the performance term and the environment term, and wherein satisfaction of the control objective is guaranteed based on:
 the environment term of the stage cost for a current time step being less than the environment term for the terminal cost at a previous time step,
 the environment term of the terminal cost for the current time step being less than the environment term for the terminal cost at the previous time step,
 the performance term of the stage cost for the current time step being less than or equal to the performance term of terminal cost for the previous time step, and
 the performance term of terminal cost for the current time step being less than or equal to the performance term of terminal cost for the previous time step;

control the machine based on the sequence of the control inputs to change the state of the machine; and submit the updated sensing instructions to the sensor.

2. The controller of claim 1, wherein the state of the environment defines second values of the state and the uncertainty of the state of the environment defines third values of the state, wherein the first values defined by the constraint exclude the second values and third values of the state.

3. The controller of claim 2, wherein the multivariable constrained optimization estimates an impact of the control inputs onto the acquired information of the environment and estimates changes to the first values according to the estimated impact of the control inputs.

4. The controller of claim 1, wherein a set of commands defined by the control inputs includes a command related to the sensing instructions having no effects on the state of the machine and changing the acquired information of the environment.

5. The controller of claim 1, wherein the controller is configured to estimate the state of the environment and the uncertainty of the state of the environment recursively based on a model of dynamics of the state of the environment.

6. The controller of claim 1, wherein the controller is configured to estimate the state of the environment and the uncertainty of the state of the environment recursively based on a dynamic function trained from data of the operation of the machine.

7. The controller of claim 1, wherein the uncertainty of the state of the environment is an inverse of the acquired information of the environment and the constraint imposed on the first values of the states and the control inputs include an interaction constraint of variables allowed to interact according to an interaction function, wherein the variables include the state of the machine, the state of the environment, and the control inputs, such that the multivariable constrained optimization is subjected to satisfy the interaction constraint in presence of the uncertainty of the state of the environment.

8. The controller of claim 7, wherein the interaction constraint bounds the interaction function by a negative of a monotonically increasing function of a metric of the uncertainty of the state of the environment.

9. The controller of claim 8, wherein the monotonically increasing function of the uncertainty of the state of the environment is based on a probability distribution of the state of the environment that determines a confidence for satisfying the interaction constraint.

10. The controller of claim 9, wherein the monotonically increasing function is determined based on a sensitivity of the interaction constraint to the state of the environment and a confidence for satisfying the interaction constraint.

11. The controller of claim 10, wherein the first values of the states of the environment and the machine decrease based on the sensitivity of the interaction constraint to the state of the environment.

12. The controller of claim 10, wherein for determining the first values of the states and the control inputs, the controller is configured to
determine a region in a space described by combinations of values of the state of the machine and the state of the environment based on the acquired information of the environment;
determine a reduction coefficient based on the uncertainty of the state of the environment and the sensitivity of the interaction constraint to the state of the environment;
modify the reduction coefficient based on the probability distribution of the uncertainty of the state of the environment and the confidence for satisfying the interaction constraint;
reduce the region based on the modified reduction coefficient; and
transform the reduced region into the constraint for the state and the control inputs of the machine being controlled.

13. The controller of claim 9, wherein the first values of the states are reduced based on the monotonically increasing function of the uncertainty of the state of the environment.

14. The controller of claim 1, wherein the controller is configured to:
check an expected progress of satisfaction of the control objective;
select the weights of the performance term and the environment term, based on the expected progress of satisfaction of the control objective.

15. The controller of claim 1, wherein the controller controls the machine iteratively over a sequence of control cycles, and wherein for execution a control cycle, the controller is configured to:
receive the state of the machine and determine a machine predictor of dynamics of the state of the machine;
receive the acquired knowledge of the environment and determine an environment predictor of dynamics of the environment;
determine interaction constraint of variables allowed to interact, wherein the variables include the state of the machine, the state of the environment, and the control inputs;
receive a machine goal, construct a control objective, construct the cost function for reaching the control objective over the prediction horizon, and determine a terminal constraint at the end of the prediction horizon;
optimize the cost function subject to the interaction constraint in presence of the uncertainty of the state of the environment to produce a sequence of optimization solutions for a sequence of time steps over the prediction horizon; and
submit a first element of the sequence of optimization solutions to one or multiple actuators of the machine and one or multiple actuators of the at least one sensor.

16. The controller of claim 1, wherein the machine is an autonomous vehicle or an autonomous robot.

17. A control method for controlling an operation of a machine, wherein the method uses a processor coupled with stored instructions implementing the method, wherein the instructions, when executed by the processor carry out steps of the method, comprising:
acquiring measurements from at least one sensor sensing an environment surrounding the machine based on a state of the machine and sensing instructions controlling an operation of the at least one sensor;
processing the measurements to acquire information of the environment;
processing the acquired information of the environment to estimate a state of the environment and uncertainty of the state of the environment, wherein the state of the environment includes one or more state variables related to the environment;
solving a multivariable constrained optimization of a model of dynamics of the machine, subject to probabilistic constraints on i.) first values of the states of the environment and the machine and ii.) a sequence of control inputs to the machine to determine jointly i.) the sequence of control inputs to the machine, wherein the sequence of control inputs define a state trajectory of the machine and ii.) desired information of the environment, wherein the model of dynamics of the machine relates the state trajectory with the sequence of the control inputs wherein the probabilistic constraints on the first values of the states of the environment and the machine and the control inputs are defined based on the state of the environment and the uncertainty of the state of the environment,
wherein the multivariable constrained optimization optimizes a cost function including:

a stage cost of the operation of the machine controlled by optimized control inputs taken along a prediction horizon, and a terminal cost associated with terminal conditions at end of the prediction horizon, wherein each of the stage cost and the terminal cost includes a performance term related to a performance of the operation of the machine relative to a control objective to be satisfied and an environment term related to the uncertainty of the state of the environment, where balancing between the performance term and the environment term is obtained by weights of each of the performance term and the environment term, and wherein satisfaction of the control objective is guaranteed based on:

the environment term of the stage cost for a current time step being less than the environment term for the terminal cost at a previous time step, the environment term of the terminal cost for the current time step being less than the environment term for the terminal cost at the previous time step, the performance term of the stage cost for the current time step being less than or equal to the performance term of terminal cost for the previous time step, and the performance term of terminal cost for the current time step being less than or equal to the performance term of terminal cost for the previous time step;

controlling the machine based on the sequence of the control inputs to change the state of the machine; and submitting the updated sensing instructions to the sensor.

18. A non-transitory computer-readable storage medium embodied thereon a program executable by a processor for performing a method, the method comprising:

acquiring measurements from at least one sensor sensing an environment surrounding the machine based on a state of the machine and sensing instructions controlling an operation of the at least one sensor;

processing the measurements to acquire information of the environment;

processing the acquired information of the environment to estimate a state of the environment and uncertainty of the state of the environment, wherein the state of the environment includes one or more state variables related to the environment;

solving a multivariable constrained optimization of a model of dynamics of the machine, subject to probabilistic constraints on i.) first values of the states of the environment and the machine and ii.) a sequence of control inputs to the machine to determine jointly i.) the sequence of control inputs to the machine, wherein the sequence of control inputs define a state trajectory of the machine and ii.) desired information of the environment, wherein the model of dynamics of the machine relates the state trajectory with the sequence of the control inputs wherein the probabilistic constraints on the first values of the states of the environment and the machine and the control inputs are defined based on the state of the environment and the uncertainty of the state of the environment, wherein the multivariable constrained optimization optimizes a cost function including:

a stage cost of the operation of the machine controlled by optimized control inputs taken along a prediction horizon, and a terminal cost associated with terminal conditions at end of the prediction horizon, wherein each of the stage cost and the terminal cost includes a performance term related to a performance of the operation of the machine relative to a control objective to be satisfied and an environment term related to the uncertainty of the state of the environment, where balancing between the performance term and the environment term is obtained by weights of each of the performance term and the environment term, and wherein satisfaction of the control objective is guaranteed based on:

the environment term of the stage cost for a current time step being less than the environment term for the terminal cost at a previous time step, the environment term of the terminal cost for the current time step being less than the environment term for the terminal cost at the previous time step, the performance term of the stage cost for the current time step being less than or equal to the performance term of terminal cost for the previous time step, and the performance term of terminal cost for the current time step being less than or equal to the performance term of terminal cost for the previous time step;

controlling the machine based on the sequence of the control inputs to change the state of the machine; and submitting the updated sensing instructions to the sensor.

* * * * *